United States Patent
Panteleev et al.

(10) Patent No.: US 12,096,419 B2
(45) Date of Patent: Sep. 17, 2024

(54) SYSTEMS AND METHODS OF PROVIDING TIMING OF SL TRANSMISSION WHEN SCHEDULED BY NR GNB

(71) Applicant: APPLE INC., Cupertino, CA (US)

(72) Inventors: Sergey Panteleev, Nizhny Novgorod (RU); Alexey Khoryaev, Nizhny Novgorod (RU); Sergey Sosnin, Zavolzhie (RU); Mikhail Shilov, Nizhny Novgorod (RU)

(73) Assignee: APPLE INC., Cupertino, CA (US)

( * ) Notice: Subject to any disclaimer, the term of this patent is extended or adjusted under 35 U.S.C. 154(b) by 382 days.

(21) Appl. No.: 17/593,078

(22) PCT Filed: Apr. 1, 2020

(86) PCT No.: PCT/US2020/026162
§ 371 (c)(1),
(2) Date: Sep. 8, 2021

(87) PCT Pub. No.: WO2020/205963
PCT Pub. Date: Oct. 8, 2020

(65) Prior Publication Data
US 2022/0191896 A1 Jun. 16, 2022

Related U.S. Application Data

(60) Provisional application No. 62/828,380, filed on Apr. 2, 2019.

(51) Int. Cl.
*H04W 72/1263* (2023.01)
*H04W 24/08* (2009.01)
(Continued)

(52) U.S. Cl.
CPC ....... *H04W 72/1263* (2013.01); *H04W 24/08* (2013.01); *H04W 72/0446* (2013.01); *H04W 72/23* (2023.01); *H04W 72/51* (2023.01)

(58) Field of Classification Search
CPC ............. H04W 72/1263; H04W 24/08; H04W 72/0446; H04W 72/23; H04W 72/51
See application file for complete search history.

(56) References Cited

U.S. PATENT DOCUMENTS

2016/0029426 A1  1/2016 Bangolae et al.
2018/0263064 A1* 9/2018 Islam ................ H04W 74/0891
(Continued)

FOREIGN PATENT DOCUMENTS

| CN | 106717105 A | 5/2017 |
| WO | 2018004323 A1 | 1/2018 |
| WO | 2020068252 A1 | 4/2020 |

OTHER PUBLICATIONS

3GPP TSG RAN WG1 Ad-Hoc Meeting 1901; R1-1900860; Taipei, Jan. 21-25, 2019, Source: Huawei, HiSilicon, Vodafone; Title: Discussion on LTE Uu to control NR sidelink. (Year: 2019).*
3GPP TSG RAN1 WG1 Meeting #96; R1-1901815, Title: Coexistence mechanisms between NR-V2X and LTE-V2X, Source: MediaTek Inc. , Athens, Greece, Feb. 25-Mar. 1, 2019. (Year: 2019).*

(Continued)

*Primary Examiner* — Mohammed S Chowdhury
(74) *Attorney, Agent, or Firm* — Dorsey & Whitney LLP

(57) ABSTRACT

Methods disclosed herein may include receiving, at a gNB from a UE, a minimum time gap between a reception at the UE of a configuring message that configures a sending of an SL transmission by the UE and the sending of the SL transmission. Alternatively, the minimum time gap may be measured from the reception at the UE of a DCI message that triggers an SL transmission and the sending of the SL transmission. The method may further include determining, at the gNB, timing information (e.g., an offset, or an absolute time) for the UE to use to schedule the SL transmission, the timing information based on the minimum time gap; generating, at the gNB, a message including a field indicating the timing information; and sending, from the gNB, the message to the UE. Analogous methods for UEs are also (Continued)

disclosed herein. Systems implementing these methods are also disclosed.

14 Claims, 10 Drawing Sheets

(51) Int. Cl.
*H04W 72/0446* (2023.01)
*H04W 72/23* (2023.01)
*H04W 72/51* (2023.01)

(56) References Cited

U.S. PATENT DOCUMENTS

| | | | |
|---|---|---|---|
| 2019/0174530 A1 | 6/2019 | Kim et al. | |
| 2019/0387557 A1* | 12/2019 | Cai | H04L 5/0005 |
| 2020/0275450 A1* | 8/2020 | Lee | H04W 72/53 |
| 2022/0007403 A1* | 1/2022 | Li | H04W 72/20 |

OTHER PUBLICATIONS

3GPP TSG RAN WG1 Meeting #96; R1-1903067; Source: Huawei, HiSilicon; Title: Discussion on NR Uu to control LTE sidelink; Athens, Greece, Feb. 25-Mar. 1, 2019 (Year: 2019).*
3GPP TSG RAN WG1 #96; R1-1902331; Source: CMCC; Title: Discussion on Uu-based sidelink resource allocation/configuration; Athens, Greece, Feb. 25-Mar. 1, 2019. (Year: 2019).*
Huawei, Hisilicon , "Discussion on Uu-based sidelink resource allocation/configuration", R1-1901544, 3GPP TSG RAN WG1 Meeting #96, Athens, Greece, Agenda Item 7.2.4.3, Feb. 25-Mar. 1, 2019, 9 pages.
Huawei, Hisilicon, Vodafone , "Discussion on LTE Uu to control NR sidelink", R1-1900860, 3GPP TSG RAN WG1 Ad-Hoc Meeting 1901, Taipei, Agenad Item 7.2.4.6, Jan. 21-25, 2019, 6 pages.
PCT/US2020/026162 , International Search Report and Written Opinion, Jun. 26, 2020, 16 pages.
Qualcomm Incorporated , "NR Uu control of LTE sidelink", R2-1905178 (was R2-1904497), 3GPP TSG RAN WG2 #105bis, Xi'an, China, Agenda Item 11.4.6, Apr. 8-12, 2019, 3 pages.

* cited by examiner

SYSTEMS AND METHODS OF PROVIDING TIMING OF SL TRANSMISSION WHEN SCHEDULED BY NR GNB

CROSS-REFERENCE TO RELATED APPLICATION(S)

This application is a national stage filing under 35 U.S.C. § 371 of International Patent Application No. PCT/US2020/026162, filed Apr. 1, 2020, which claims the benefit of U.S. Provisional Application No. 62/828,380, filed Apr. 2, 2019, each of which is hereby incorporated by reference herein in its entirety.

TECHNICAL FIELD

This application relates generally to wireless communication systems, and more specifically to providing timing of sidelink (SL) transmission(s).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
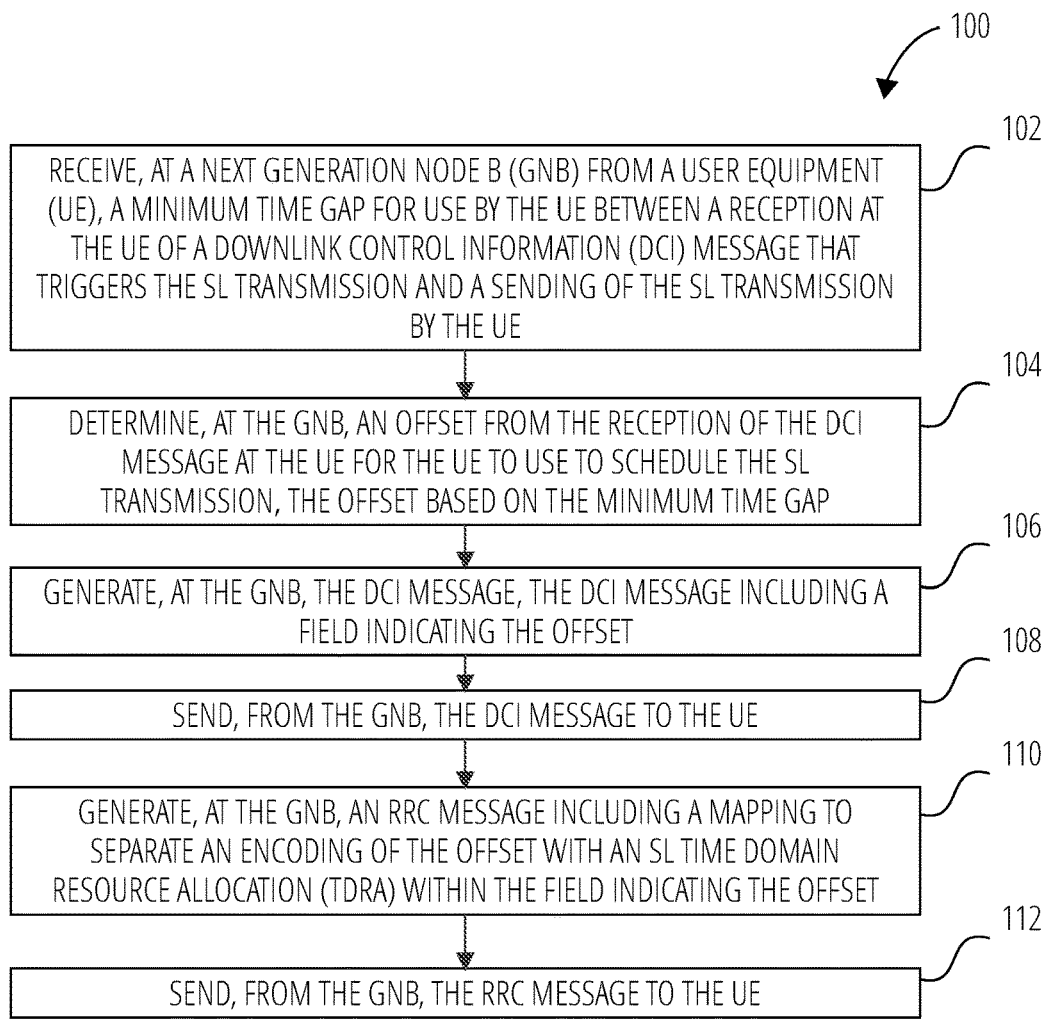
FIG. 1 illustrates a method for scheduling a sidelink (SL) transmission, in accordance with one embodiment.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

In new radio (NR), a Next Generation NodeB (gNB)-controlled mode of sidelink (SL) operation may be supported. The support may use at least one of three basic approaches: dynamic grant using Downlink Control Information (DCI); configured grant with activation/release in DCI; or configured grant based on Radio Resource Control (RRC).

In embodiments disclosed herein, aspects of network controlled scheduling of SL transmissions are provided. In particular, in certain embodiments, methods and apparatus are configured to provide NR SL transmission timing information when scheduled by DCI. In certain embodiments, methods and apparatus are configured to provide scheduling of Long Term Evolution (LTE) SL transmission by RRC signaling.

NR gNB Controlling NR Sidelink

It may be in some cases that receivers are agnostic to a mode of operation used for transmissions. Under this assumption, Mode-1 functionality may be confined to design of DCI and RRC signaling for the dynamic and configured scheduling together with assistance signaling from UEs. Further, it may be desirable to commonly develop the design of SL transmission procedures in a framework of SL physical layer procedures.

DCI Monitoring

A DCI may be size matched with other formats to be monitored for Uu operation (formats 0_0, 0_1, 1_0, 1_1, etc.) in order to keep the same DCI size budget and blind decoding budget. When the DCI is size-matched, a new Radio Network Temporary Identifier (RNTI) for monitoring of this DCI may be desirable.

In one embodiment, the DCI format for an SL grant is configured with a Control Resource Set (CORESET), a search space, periodicity of monitoring, and number of candidates per aggregation level.

Timing Information

The DCI may also carry timing of an SL transmission with respect to the instance of DCI reception. In LTE, this timing was a fixed value. However, it has been recognized that a variable timing may be useful in the case of, for example, potentially different subcarrier spacing between Uu carrier and SL carrier. Moreover, a variable timing may also be useful because it can capture different gaps between DL occasion for monitoring and an SL occasion for transmission due to different Uplink (UL)-Downlink (DL) configurations.

In one embodiment, a timing offset between a DCI reception instance and an SL transmission, a K3 value (i.e., delay or offset value), is conveyed in the DCI content scheduling an SL transmission. In one example, the K3 value may be explicitly encoded as a separate bit-field. Here, the possible set of K3 values addressable in DCI may be configured by RRC. In another example, the K3 value may be jointly encoded with an SL time domain resource allocation (TDRA) indication, where the mapping from the joint indication to a separate K3 value and SL TDRA may be provided in an RRC message as a table.

In another embodiment, a timing offset between a DCI reception instance and an SL transmission, a K3 value, may be configured by an RRC message.

In one embodiment, if the K3 value points to a slot without available SL symbol(s), a UE is expected to transmit in a first slot with available SL symbol(s) after the slot pointed to by the K3 value.

The K3 value may be signaled in terms of slots. Alternatively, the K3 value may be signaled in terms of symbols.

In one embodiment, a UE is not expected to be scheduled with a K3 value that is less than the minimum Physical Sidelink Control Channel (PSCCH)/Physical Sidelink Shared Channel (PSSCH) preparation time in a given processing capability. The PSCCH/PSSCH preparation time may follow the same values per Subcarrier Spacing (SCS) as Tproc,2 Physical Uplink Shared Channel (PUSCH) preparation time, since PSSCH preparation and SL grant decoding should take a similar amount of time as PUSCH preparation+UL grant decoding.

NR gNB Controlling LTE Sidelink

Certain wireless systems and methods may assume that the resources for LTE SL transmission under network control are configured and activated/deactivated semi-statically. This may suit Semi-Persistent Scheduling (SPS)-types of transmissions since the usage of RRC for allocation of every transmission may be very inefficient. In these certain wireless systems and methods, provision of explicit timing information indicating where a transmission is expected to start may be expected. It may be that a NR gNB can derive offsets relative to a Direct Frame Number (DFN)/System Frame Number (SFN) in terms of LTE subframes and signal the offset in the RRC grant. Alternatively, absolute time (e.g., UTC) of a starting transmission may be used so that no conversion between NR and LTE slots, SFNs, DFNs, is performed.

Replacing DCI-based activation/deactivation for LTE Mode-3 may be done in a similar way as a NR Type 1 configured grant. For example, the parameters being signaled in DCI may be fixed in an RRC message.

In addition, as a further optimization, the number of occasions and/or time for a configuration to be active may be signaled. In one embodiment, an RRC message conveys a number of PSCCH/PSSCH occasions which are active after the reception of the RRC message. The possible number should include at least one occasion. Once a counter over these active occasions expires, the configured resources are assumed to be released. As an alternative, the signaling of an absolute time of activity of the configured resources may be used.

As part of assistance signaling, in one embodiment, a UE may report a minimum time gap between an instance of an RRC message reception in NR Uu and an SL transmission according to this message in LTE. It may also be a part of UE capability framework.

In another embodiment, a UE may report a cross-Radio Access Technology (RAT) scheduling delay as a time gap between an instance of DCI reception in NR Uu and an SL transmission according to this DCI.

FIG. 1 illustrates a method 100 for scheduling an SL transmission, in accordance with one embodiment. The method 100 includes receiving 102, at a Next Generation Node B (gNB) from a user equipment (UE), a minimum time gap for use by the UE between a reception of a Downlink Control Information (DCI) message that triggers the SL transmission and a sending of the SL transmission by the UE. A DCI message that triggers the SL transmission may be a DCI transmission that ultimately causes the SL transmission, as described above.

The method 100 further includes determining 104, at the gNB, an offset from the reception of the DCI message at the UE for the UE to use to schedule the SL transmission, the offset based on the minimum time gap.

The method 100 further includes generating 106, at the gNB, the DCI message, the DCI message including a field indicating the offset.

The method 100 further includes sending 108, from the gNB, the DCI message to the UE.

The method 100 further includes generating 110, at the gNB, an RRC message including a mapping to separate an encoding of the offset with an SL time domain resource allocation (TDRA) within the field indicating the offset.

The method 100 further includes sending 112, from the gNB, the RRC message to the UE.

Figure 2:
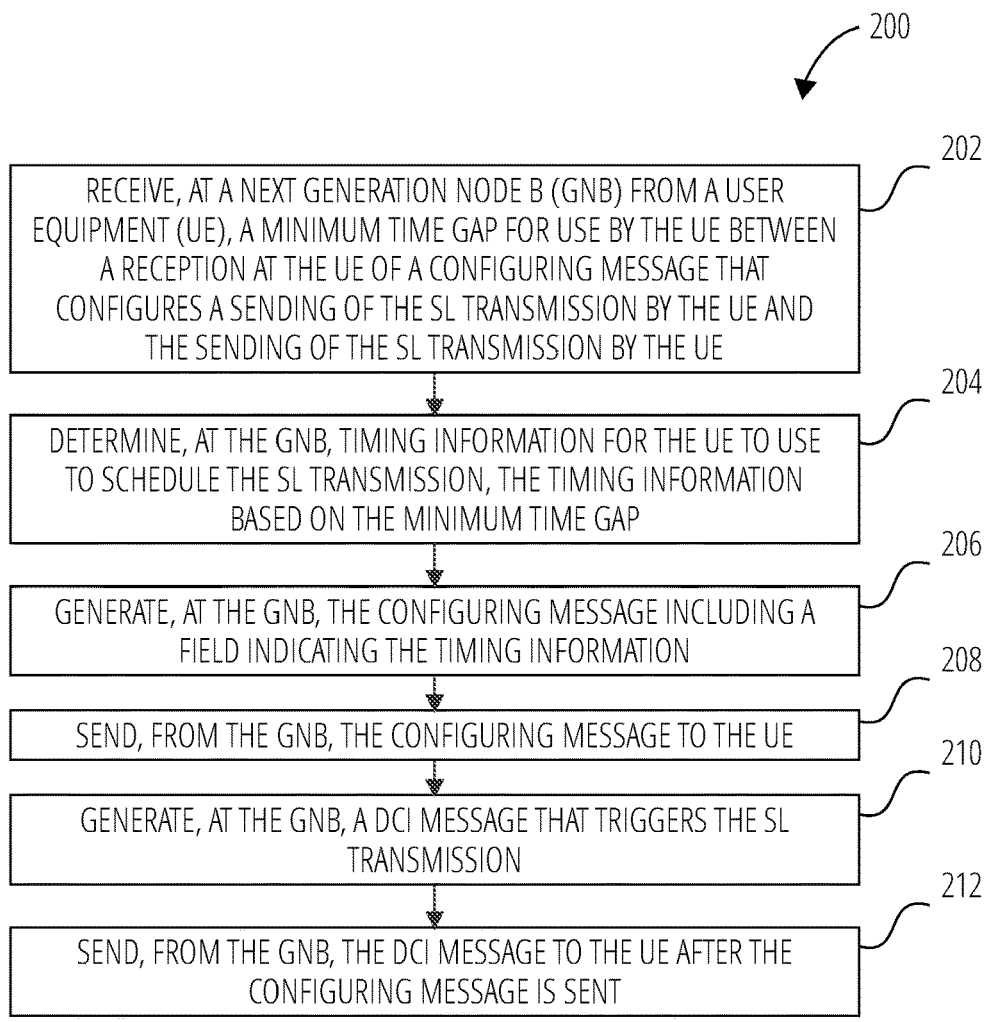
FIG. 2 illustrates a method for scheduling an SL transmission, in accordance with one embodiment.

FIG. 2 illustrates a method 200 for scheduling an SL transmission, in accordance with one embodiment. The method 200 includes receiving 202, at a Next Generation Node B (gNB) from a user equipment (UE), a minimum time gap for use by the UE between a reception of a configuring message that configures a sending of the SL transmission by the UE and the sending of the SL transmission by the UE.

The method 200 further includes determining 204, at the gNB, timing information for the UE to use to schedule the SL transmission, the timing information based on the minimum time gap.

The method 200 further includes generating 206, at the gNB, the configuring message including a field indicating the timing information.

The method 200 further includes sending 208, from the gNB, the configuring message to the UE.

The method 200 further includes generating 210, at the gNB, a DCI message that triggers the SL transmission. A DCI message that triggers the SL transmission may be a DCI transmission that ultimately causes the SL transmission, as described above.

The method 200 further includes sending 212, from the gNB, the DCI message to the UE after the configuring message is sent.

Figure 3:
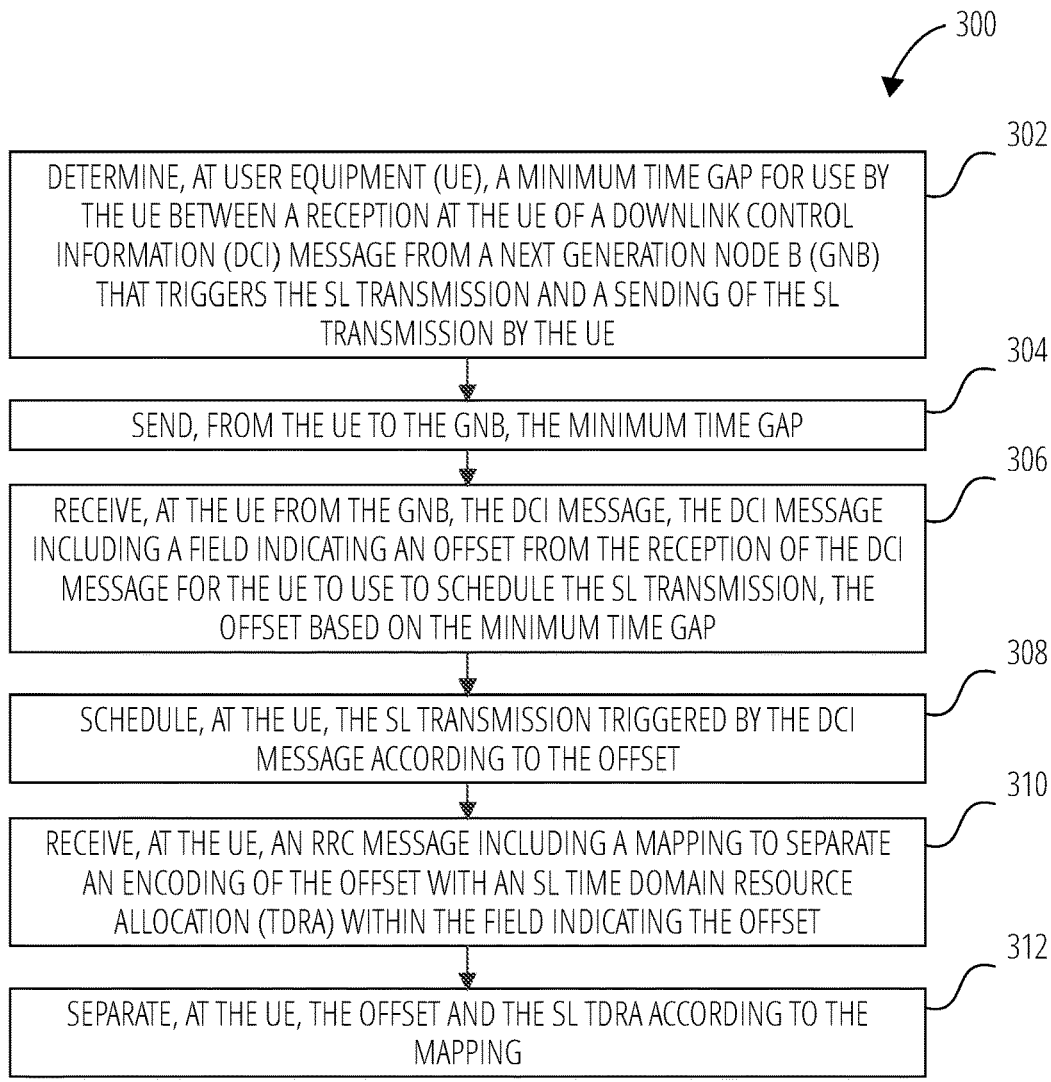
FIG. 3 illustrates a method for scheduling an SL transmission, in accordance with one embodiment.

FIG. 3 illustrates a method 300 for scheduling an SL transmission, in accordance with one embodiment. The method 300 includes determining 302, at user equipment (UE), a minimum time gap for use by the UE between a reception of a Downlink Control Information (DCI) message from a Next Generation Node B (gNB) that triggers the SL transmission and a sending of the SL transmission by the UE. A DCI message that triggers the SL transmission may be a DCI transmission that ultimately causes the SL transmission, as described above.

The method 300 further includes sending 304, from the UE to the gNB, the minimum time gap.

The method 300 further includes receiving 306, at the UE from the gNB, the DCI message, the DCI message including a field indicating an offset from the reception of the DCI message for the UE to use to schedule the SL transmission, the offset based on the minimum time gap.

The method 300 further includes scheduling 308, at the UE, the SL transmission triggered by the DCI message according to the offset.

The method 300 further includes receiving 310, at the UE, an RRC message including a mapping to separate an encoding of the offset with an SL time domain resource allocation (TDRA) within the field indicating the offset.

The method 300 further includes separating 312, at the UE, the offset and the SL TDRA according to the mapping.

Figure 4:
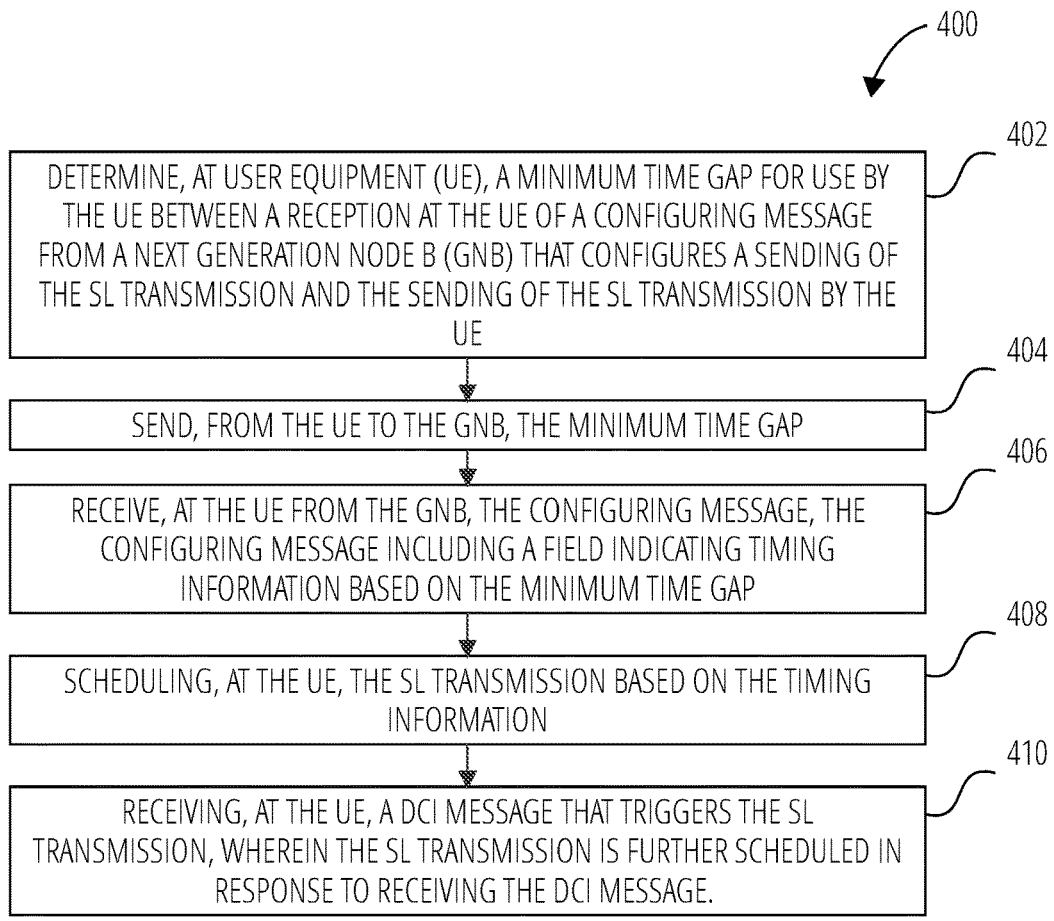
FIG. 4 illustrates a method for scheduling an SL transmission, in accordance with one embodiment.

FIG. 4 illustrates a method 400 for scheduling an SL transmission, in accordance with one embodiment. The method 400 includes determining 402, at user equipment (UE), a minimum time gap for use by the UE between a reception of a configuring message from a Next Generation Node B (gNB) that configures a sending of the SL transmission and the sending of the SL transmission by the UE.

The method 400 further includes sending 404, from the UE to the gNB, the minimum time gap.

The method 400 further includes receiving 406, at the UE from the gNB, the configuring message, the configuring message including a field indicating timing information based on the minimum time gap.

The method 400 further includes scheduling 408, at the UE, the SL transmission based on the timing information.

The method 400 further includes receiving 410, at the UE, a DCI message that triggers the SL transmission, wherein the SL transmission is further scheduled in response to receiving the DCI message. A DCI message that triggers the SL transmission may be a DCI transmission that ultimately causes the SL transmission, as described above.

Figure 5:
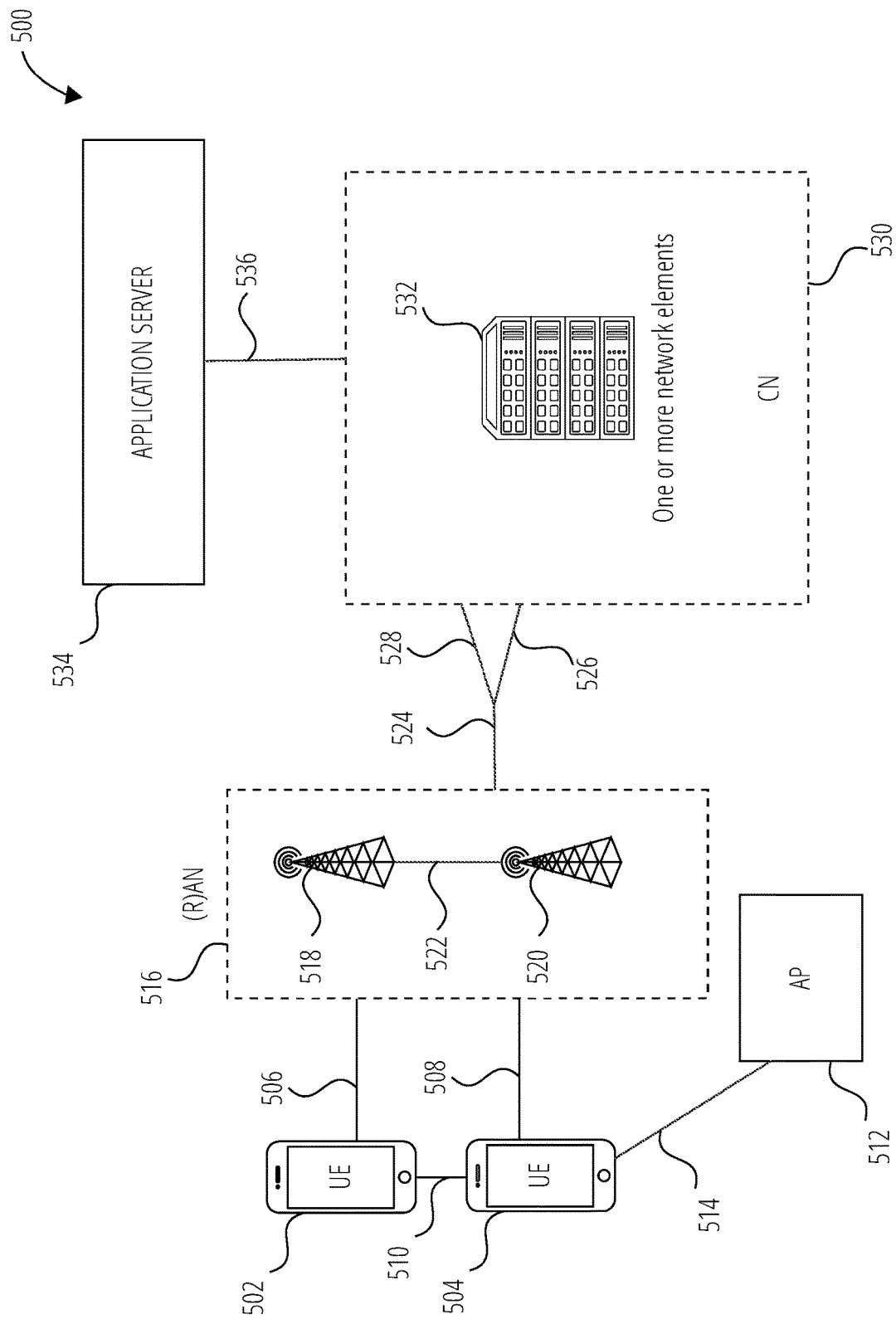
FIG. 5 illustrates a system in accordance with one embodiment.

FIG. 5 illustrates an example architecture of a system 500 of a network, in accordance with various embodiments. The following description is provided for an example system 500 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 5, the system 500 includes UE 502 and UE 504. In this example, the UE 502 and the UE 504 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 502 and/or the UE 504 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 502 and UE 504 may be configured to connect, for example, communicatively couple, with an access node or radio access node (shown as (R)AN 516). In embodiments, the (R)AN 516 may be an NG RAN or a 5G RAN, an E-UTRAN, or a legacy RAN, such as a UTRAN or GERAN. As used herein, the term "NG RAN" or the like may refer to a (R)AN 516 that operates in an NR or 5G system, and the term "E-UTRAN" or the like may refer to a (R)AN 516 that operates in an LTE or 4G system. The UE 502 and UE 504 utilize connections (or channels) (shown as connection 506 and connection 508, respectively), each of which comprises a physical communications interface or layer (discussed in further detail below).

In this example, the connection 506 and connection 508 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 502 and UE 504 may directly exchange communication data via a ProSe interface 510. The ProSe interface 510 may alternatively be referred to as a sidelink (SL) interface 510 and may comprise one or more logical channels, including but not limited to a PSCCH, a PSSCH, a PSDCH, and a PSBCH.

The UE 504 is shown to be configured to access an AP 512 (also referred to as "WLAN node," "WLAN," "WLAN Termination," "WT" or the like) via connection 514. The connection 514 can comprise a local wireless connection, such as a connection consistent with any IEEE 802.11 protocol, wherein the AP 512 would comprise a wireless fidelity (Wi-Fi®) router. In this example, the AP 512 may be connected to the Internet without connecting to the core network of the wireless system (described in further detail below). In various embodiments, the UE 504, (R)AN 516, and AP 512 may be configured to utilize LWA operation and/or LWIP operation. The LWA operation may involve the UE 504 in RRC_CONNECTED being configured by the RAN node 518 or the RAN node 520 to utilize radio resources of LTE and WLAN. LWIP operation may involve the UE 504 using WLAN radio resources (e.g., connection 514) via IPsec protocol tunneling to authenticate and encrypt packets (e.g., IP packets) sent over the connection 514. IPsec tunneling may include encapsulating the entirety of original IP packets and adding a new packet header, thereby protecting the original header of the IP packets.

The (R)AN 516 can include one or more AN nodes, such as RAN node 518 and RAN node 520, that enable the connection 506 and connection 508. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 500 (e.g., an eNB). According to various embodiments, the RAN node 518 or RAN node 520 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 518 or RAN node 520 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 518 or RAN node 520); a MAC/PHY split wherein RRC, PDCP, RLC, and MAC layers are operated by the CRAN/vBBUP and the PHY layer is operated by individual RAN nodes (e.g., RAN node 518 or RAN node 520); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 518 or RAN node 520 to perform other virtualized applications. In some implementations, an individual RAN node may represent individual gNB-DUs that are connected to a gNB-CU via individual F1 interfaces (not shown by FIG. 5). In these implementations, the gNB-DUs may include one or more remote radio heads or RFEMs, and the gNB-CU may be operated by a server that is located in the (R)AN 516 (not shown) or by a server pool in a similar manner as the CRAN/vBBUP. Additionally, or alternatively, one or more of the RAN node 518 or RAN node 520 may be next generation eNBs (ng-eNBs), which are RAN nodes that provide E-UTRA user plane and control plane protocol terminations toward the UE 502 and UE 504, and are connected to an SGC via an NG interface (discussed infra). In V2X scenarios one or more of the RAN node 518 or RAN node 520 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 518 and/or the RAN node 520 can terminate the air interface protocol and can be the first point of contact for the UE 502 and UE 504. In some embodiments, the RAN node 518 and/or the RAN node 520 can fulfill various logical functions for the (R)AN 516 including, but not limited to, radio network controller (RNC) functions such as radio bearer management, uplink and downlink dynamic radio resource management and data packet scheduling, and mobility management.

In embodiments, the UE 502 and UE 504 can be configured to communicate using OFDM communication signals with each other or with the RAN node 518 and/or the RAN node 520 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 518 and/or the RAN node 520 to the UE 502 and UE 504, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 502 and UE 504 and the RAN node 518 and/or the RAN node 520 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 502 and UE 504 and the RAN node 518 or RAN node 520 may operate using LAA, eLAA, and/or feLAA mechanisms. In these implementations, the UE 502 and UE 504 and the RAN node 518 or RAN node 520 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 502 and UE 504, RAN node 518 or RAN node 520, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 502, AP 512, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 502 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 502 and UE 504. The PDCCH carries information about the transport format and resource allocations related to the PDSCH channel, among other things. It may also inform the UE 502 and UE 504 about the transport format, resource allocation, and HARQ information related to the uplink shared channel. Typically, downlink scheduling (assigning control and shared channel resource blocks to the UE 504 within a cell) may be performed at any of the RAN node 518 or RAN node 520 based on channel quality information fed back from any of the UE 502 and UE 504. The downlink resource assignment information may be sent on the PDCCH used for (e.g., assigned to) each of the UE 502 and UE 504.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 518 or RAN node 520 may be configured to communicate with one another via interface 522. In embodiments where the system 500 is an LTE system (e.g., when CN 530 is an EPC), the interface 522 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 502 from an SeNB for user data; information of PDCP PDUs that were not delivered to a UE 502; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 500 is a SG or NR system (e.g., when CN 530 is an SGC), the interface 522 may be an Xn interface. The Xn interface is defined between two or more RAN nodes (e.g., two or more gNBs and the like) that connect to SGC, between a RAN node 518 (e.g., a gNB) connecting to SGC and an eNB, and/or between two eNBs connecting to 5GC (e.g., CN 530). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 502 in a connected mode (e.g., CM-CONNECTED) including functionality to manage the UE mobility for connected mode between one or more RAN node 518 or RAN node 520. The mobility support may include context transfer from an old (source) serving RAN node 518 to new (target) serving RAN node 520; and control of user plane tunnels between old (source) serving RAN node 518 to new (target) serving RAN node 520. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 516 is shown to be communicatively coupled to a core network-in this embodiment, CN 530. The CN 530 may comprise one or more network elements 532, which are configured to offer various data and telecommunications services to customers/subscribers (e.g., users of UE 502 and UE 504) who are connected to the CN 530 via the (R)AN 516. The components of the CN 530 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 530 may be referred to as a network slice, and a logical instantiation of a portion of the CN 530 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 534 may be an element offering applications that use IP bearer resources with the core network (e.g., UMTS PS domain, LTE PS data services, etc.). The application server 534 can also be configured to support one or more communication services (e.g., VoIP sessions, PTT sessions, group communication sessions, social networking services, etc.) for the UE 502 and UE 504 via the EPC. The application server 534 may communicate with the CN 530 through an IP communications interface 536.

In embodiments, the CN 530 may be an SGC, and the (R)AN 116 may be connected with the CN 530 via an NG interface 524. In embodiments, the NG interface 524 may be split into two parts, an NG user plane (NG-U) interface 526, which carries traffic data between the RAN node 518 or RAN node 520 and a UPF, and the S1 control plane (NG-C) interface 528, which is a signaling interface between the RAN node 518 or RAN node 520 and AMFs.

In embodiments, the CN 530 may be a SG CN, while in other embodiments, the CN 530 may be an EPC). Where CN 530 is an EPC, the (R)AN 116 may be connected with the CN 530 via an S1 interface 524. In embodiments, the S1 interface 524 may be split into two parts, an S1 user plane (S1-U) interface 526, which carries traffic data between the RAN node 518 or RAN node 520 and the S-GW, and the S1-MME interface 528, which is a signaling interface between the RAN node 518 or RAN node 520 and MMEs.

Figure 6:
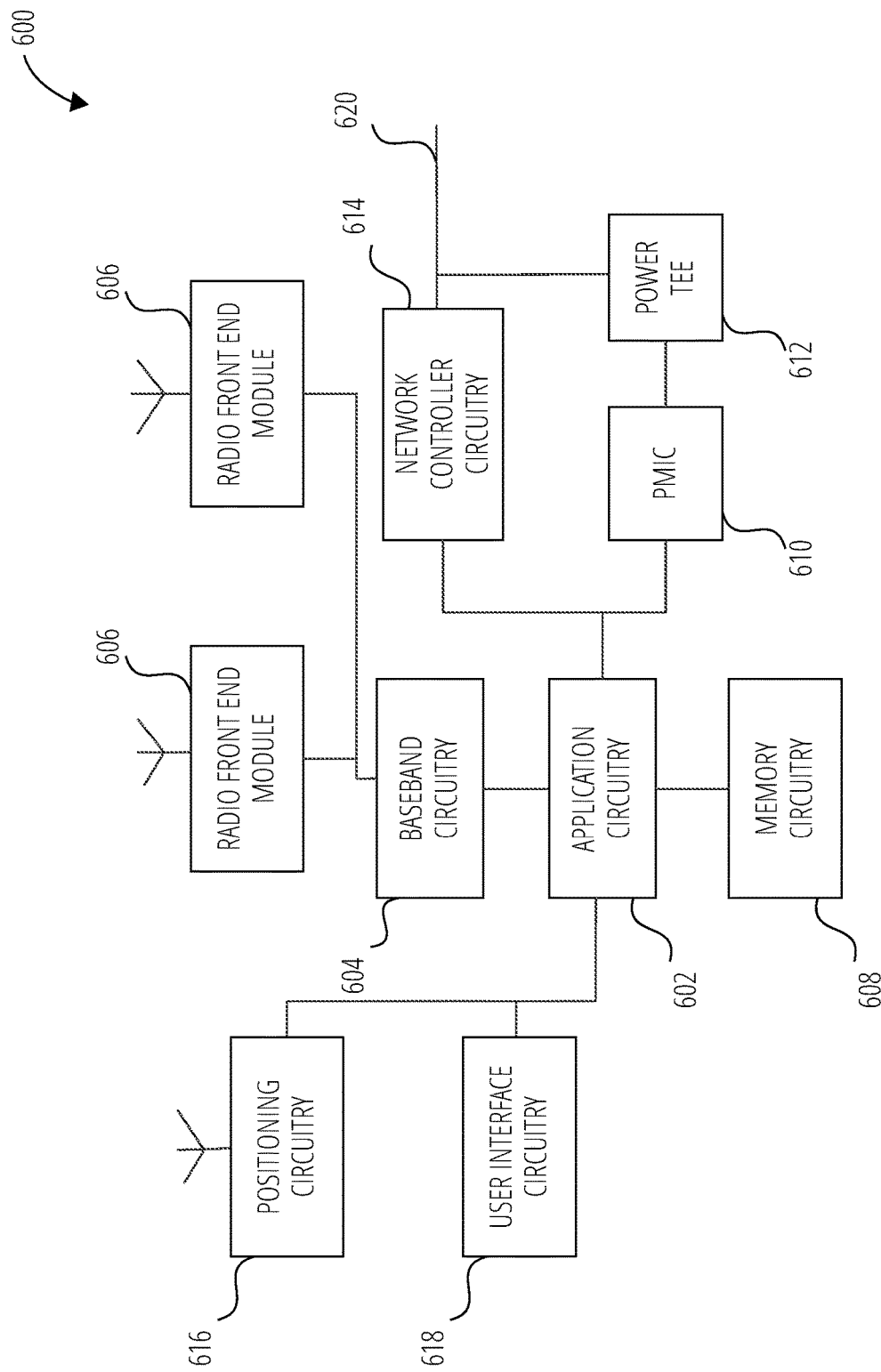
FIG. 6 illustrates an infrastructure equipment in accordance with one embodiment.

FIG. 6 illustrates an example of infrastructure equipment 600 in accordance with various embodiments. The infrastructure equipment 600 may be implemented as a base station, radio head, RAN node, AN, application server, and/or any other element/device discussed herein. In other examples, the infrastructure equipment 600 could be implemented in or by a UE.

The infrastructure equipment 600 includes application circuitry 602, baseband circuitry 604, one or more radio front end module 606 (RFEM), memory circuitry 608, power management integrated circuitry (shown as PMIC 610), power tee circuitry 612, network controller circuitry 614, network interface connector 620, satellite positioning circuitry 616, and user interface circuitry 618. In some embodiments, the device infrastructure equipment 600 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 602 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 602 may be coupled with or may include memory/storage elements and may be configured to execute instructions stored in the memory/storage to enable various applications or operating systems to run on the infrastructure equipment 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 602 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 602 may comprise, or may be, a special-purpose processor/controller to operate according to the various embodiments herein. As examples, the processor(s) of application circuitry 602 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the infrastructure equipment 600 may not utilize application circuitry 602, and instead may include a special-purpose processor/controller to process IP data received from an EPC or 5GC, for example.

In some implementations, the application circuitry 602 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 602 may comprise logic blocks or logic fabric, and other interconnected resources that may be programmed to perform various functions, such as the procedures, methods, functions, etc. of the various embodiments discussed herein. In such embodiments, the circuitry of application circuitry 602 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 604 may be implemented, for example, as a solder-down substrate including one or more integrated circuits, a single packaged integrated circuit soldered to a main circuit board or a multi-chip module containing two or more integrated circuits.

The user interface circuitry 618 may include one or more user interfaces designed to enable user interaction with the infrastructure equipment 600 or peripheral component interfaces designed to enable peripheral component interaction with the infrastructure equipment 600. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 606 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 606, which incorporates both mmWave antennas and sub-mmWave.

The memory circuitry 608 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 608 may be implemented as one or more of solder down packaged integrated circuits, socketed memory modules and plug-in memory cards.

The PMIC 610 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 612 may provide for electrical power drawn from a network cable to provide both power supply and data connectivity to the infrastructure equipment 600 using a single cable.

The network controller circuitry 614 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 via network interface connector 620 using a physical connection, which may be electrical (commonly referred to as a "copper interconnect"), optical, or wireless. The network controller circuitry 614 may include one or more dedicated processors and/or FPGAs to communicate using one or more of the aforementioned protocols. In some implementations, the network controller circuitry 614 may include multiple controllers to provide connectivity to other networks using the same or different protocols.

The positioning circuitry 616 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 616 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 616 may include a Micro-Technology for Positioning, Navigation, and Timing (Micro-PNT) IC that uses a master timing clock to perform position tracking/estimation without GNSS assistance. The positioning circuitry 616 may also be part of, or interact with, the baseband circuitry 604 and/or radio front end module 606 to communicate with the nodes and components of the positioning network. The positioning circuitry 616 may also provide position data and/or time data to the application circuitry 602, which may use the data to synchronize operations with various infrastructure, or the like. The components shown by FIG. 6 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a SoC based system. Other bus/IX systems may be included, such as an I²C interface, an SPI interface, point to point interfaces, and a power bus, among others.

Figure 7:
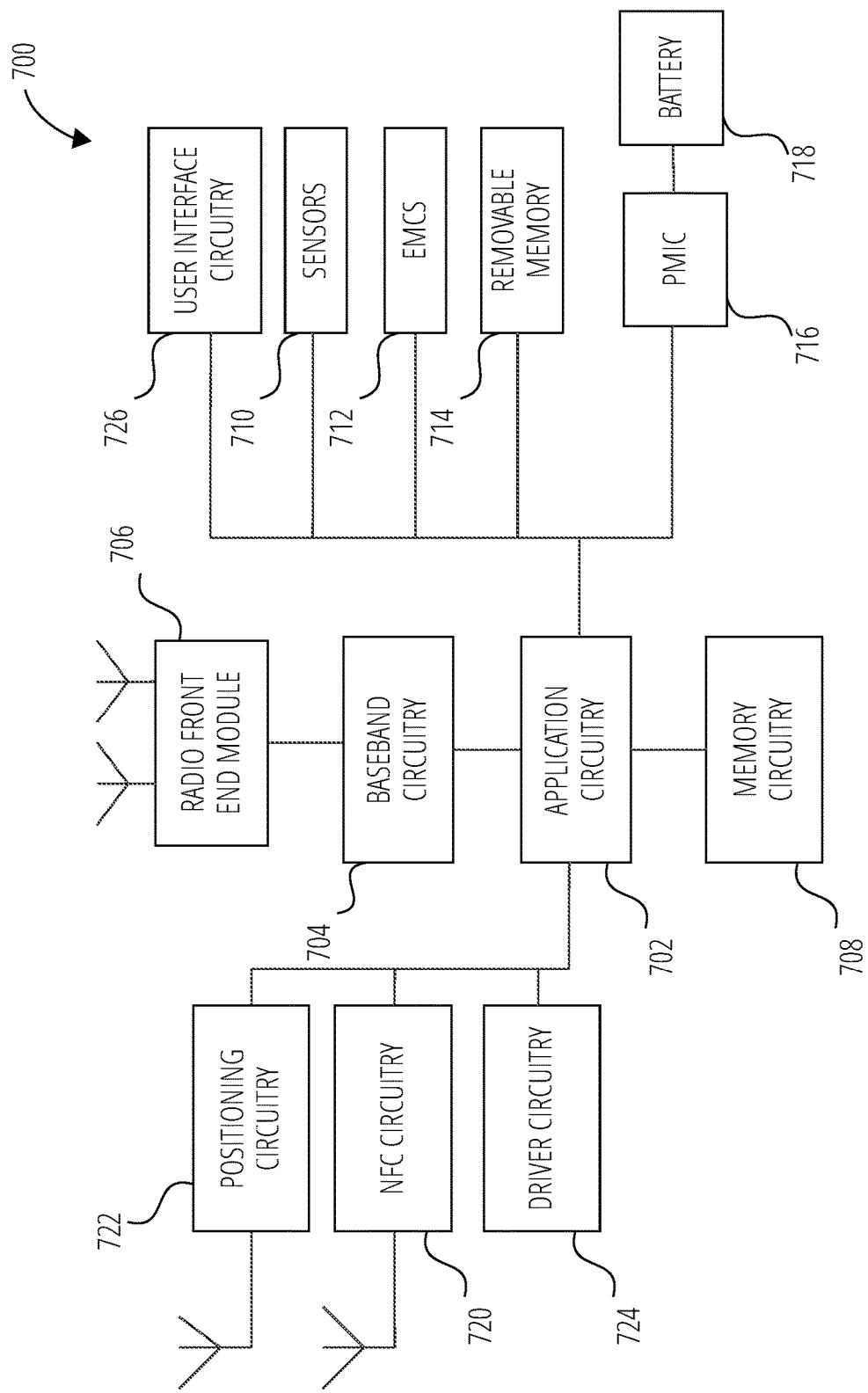
FIG. 7 illustrates a platform in accordance with one embodiment.

FIG. 7 illustrates an example of a platform 700 in accordance with various embodiments. In embodiments, the computer platform 700 may be suitable for use as UEs, application servers, and/or any other element/device discussed herein. The platform 700 may include any combinations of the components shown in the example. The components of platform 700 may be implemented as integrated circuits (ICs), portions thereof, discrete electronic devices, or other modules, logic, hardware, software, firmware, or a combination thereof adapted in the computer platform 700, or as components otherwise incorporated within a chassis of a larger system. The block diagram of FIG. 7 is intended to show a high level view of components of the computer platform 700. However, some of the components shown may be omitted, additional components may be present, and different arrangement of the components shown may occur in other implementations.

Application circuitry 702 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 702 may be coupled with or may include memory/storage elements and may be configured to execute instructions stored in the memory/storage to enable various applications or operating systems to run on the platform 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 702 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 702 may comprise, or may be, a special-purpose processor/controller to operate according to the various embodiments herein.

As examples, the processor(s) of application circuitry 702 may include an Intel® Architecture Core™ based processor, such as a Quark™, an Atom™, an i3, an i5, an i7, or an MCU-class processor, or another such processor available from Intel® Corporation. The processors of the application circuitry 702 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 702 may be a part of a system on a chip (SoC) in which the application circuitry 702 and other components are formed into a single integrated circuit, or a single package, such as the Edison™ or Galileo™ SoC boards from Intel® Corporation.

Additionally or alternatively, application circuitry 702 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 702 may comprise logic blocks or logic fabric, and other interconnected resources that may be programmed to perform various functions, such as the procedures, methods, functions, etc. of the various embodiments discussed herein. In such embodiments, the circuitry of application circuitry 702 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 704 may be implemented, for example, as a solder-down substrate including one or more integrated circuits, a single packaged integrated circuit soldered to a main circuit board or a multi-chip module containing two or more integrated circuits.

The radio front end module 706 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 706, which incorporates both mmWave antennas and sub-mmWave.

The memory circuitry 708 may include any number and type of memory devices used to provide for a given amount of system memory. As examples, the memory circuitry 708 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 708 may be developed in accordance with a Joint Electron Devices Engineering Council (JEDEC) low power double data rate (LPDDR)-based design, such as LPDDR2, LPDDR3, LPDDR4, or the like. Memory circuitry 708 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 708 may be on-die memory or registers associated with the application circuitry 702. To provide for persistent storage of information such as data, applications, operating systems and so forth, memory circuitry 708 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 700 may incorporate the three-dimensional (3D) cross-point (XPOINT) memories from Intel® and Micron®.

The removable memory 714 may include devices, circuitry, enclosures/housings, ports or receptacles, etc. used to couple portable data storage devices with the platform 700. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 700 may also include interface circuitry (not shown) that is used to connect external devices with the platform 700. The external devices connected to the platform 700 via the interface circuitry include sensors 710 and electro-mechanical components (shown as EMCs 712), as well as removable memory devices coupled to removable memory 714.

The sensors 710 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 712 include devices, modules, or subsystems whose purpose is to enable platform 700 to change its state, position, and/or orientation, or move or control a mechanism or (sub)system. Additionally, EMCs 712 may be configured to generate and send messages/signaling to other components of the platform 700 to indicate a current state of the EMCs 712. Examples of the EMCs 712 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 700 is configured to operate one or more EMCs 712 based on one or more captured events and/or instructions or control signals received from a service provider and/or various clients. In some implementations, the interface circuitry may connect the platform 700 with positioning circuitry 722. The positioning circuitry 722 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 722 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 722 may include a Micro-PNT IC that uses a master timing clock to perform position tracking/estimation without GNSS assistance. The positioning circuitry 722 may also be part of, or interact with, the baseband circuitry 704 and/or radio front end module 706 to communicate with the nodes and components of the positioning network. The positioning circuitry 722 may also provide position data and/or time data to the application circuitry 702, which may use the data to synchronize operations with various infrastructure (e.g., radio base stations), for turn-by-turn navigation applications, or the like.

In some implementations, the interface circuitry may connect the platform 700 with Near-Field Communication circuitry (shown as NFC circuitry 720). The NFC circuitry 720 is configured to provide contactless, short-range communications based on radio frequency identification (RFID) standards, wherein magnetic field induction is used to enable communication between NFC circuitry 720 and NFC-enabled devices external to the platform 700 (e.g., an "NFC touchpoint"). NFC circuitry 720 comprises an NFC controller coupled with an antenna element and a processor coupled with the NFC controller. The NFC controller may be a chip/IC providing NFC functionalities to the NFC circuitry 720 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 720, or initiate data transfer between the NFC circuitry 720 and another active NFC device (e.g., a smartphone or an NFC-enabled POS terminal) that is proximate to the platform 700.

The driver circuitry 724 may include software and hardware elements that operate to control particular devices that are embedded in the platform 700, attached to the platform 700, or otherwise communicatively coupled with the platform 700. The driver circuitry 724 may include individual drivers allowing other components of the platform 700 to interact with or control various input/output (I/O) devices that may be present within, or connected to, the platform 700. For example, driver circuitry 724 may include a display driver to control and allow access to a display device, a touchscreen driver to control and allow access to a touchscreen interface of the platform 700, sensor drivers to obtain sensor readings of sensors 710 and control and allow access to sensors 710, EMC drivers to obtain actuator positions of the EMCs 712 and/or control and allow access to the EMCs 712, a camera driver to control and allow access to an embedded image capture device, audio drivers to control and allow access to one or more audio devices.

The power management integrated circuitry (shown as PMIC 716) (also referred to as "power management circuitry") may manage power provided to various components of the platform 700. In particular, with respect to the baseband circuitry 704, the PMIC 716 may control powersource selection, voltage scaling, battery charging, or DC-to-DC conversion. The PMIC 716 may often be included when the platform 700 is capable of being powered by a battery 718, for example, when the device is included in a UE.

In some embodiments, the PMIC 716 may control, or otherwise be part of, various power saving mechanisms of the platform 700. For example, if the platform 700 is in an RRC_Connected state, where it is still connected to the RAN node as it expects to receive traffic shortly, then it may enter a state known as Discontinuous Reception Mode (DRX) after a period of inactivity. During this state, the platform 700 may power down for brief intervals of time and thus save power. If there is no data traffic activity for an extended period of time, then the platform 700 may transition off to an RRC Idle state, where it disconnects from the network and does not perform operations such as channel quality feedback, handover, etc. The platform 700 goes into a very low power state and it performs paging where again it periodically wakes up to listen to the network and then powers down again. The platform 700 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 718 may power the platform 700, although in some examples the platform 700 may be mounted deployed in a fixed location, and may have a power supply coupled to an electrical grid. The battery 718 may be a lithium ion battery, a metal-air battery, such as a zinc-air battery, an aluminum-air battery, a lithium-air battery, and the like. In some implementations, such as in V2X applications, the battery 718 may be a typical lead-acid automotive battery.

In some implementations, the battery 718 may be a "smart battery," which includes or is coupled with a Battery Management System (BMS) or battery monitoring integrated circuitry. The BMS may be included in the platform 700 to track the state of charge (SoCh) of the battery 718. The BMS may be used to monitor other parameters of the battery 718 to provide failure predictions, such as the state of health (SoH) and the state of function (SoF) of the battery 718. The BMS may communicate the information of the battery 718 to the application circuitry 702 or other components of the platform 700. The BMS may also include an analog-to-digital (ADC) convertor that allows the application circuitry 702 to directly monitor the voltage of the battery 718 or the current flow from the battery 718. The battery parameters may be used to determine actions that the platform 700 may perform, such as transmission frequency, network operation, sensing frequency, and the like.

A power block, or other power supply coupled to an electrical grid may be coupled with the BMS to charge the battery 718. In some examples, the power block may be replaced with a wireless power receiver to obtain the power wirelessly, for example, through a loop antenna in the computer platform 700. In these examples, a wireless battery charging circuit may be included in the BMS. The specific charging circuits chosen may depend on the size of the battery 718, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 726 includes various input/output (I/O) devices present within, or connected to, the platform 700, and includes one or more user interfaces designed to enable user interaction with the platform 700 and/or peripheral component interfaces designed to enable peripheral component interaction with the platform 700. The user interface circuitry 726 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 700. The output device circuitry may also include speakers or other audio emitting devices, printer(s), and/or the like. In some embodiments, the sensors 710 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 700 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an $I^2C$ interface, an SPI interface, point-to-point interfaces, and a power bus, among others.

Figure 8:
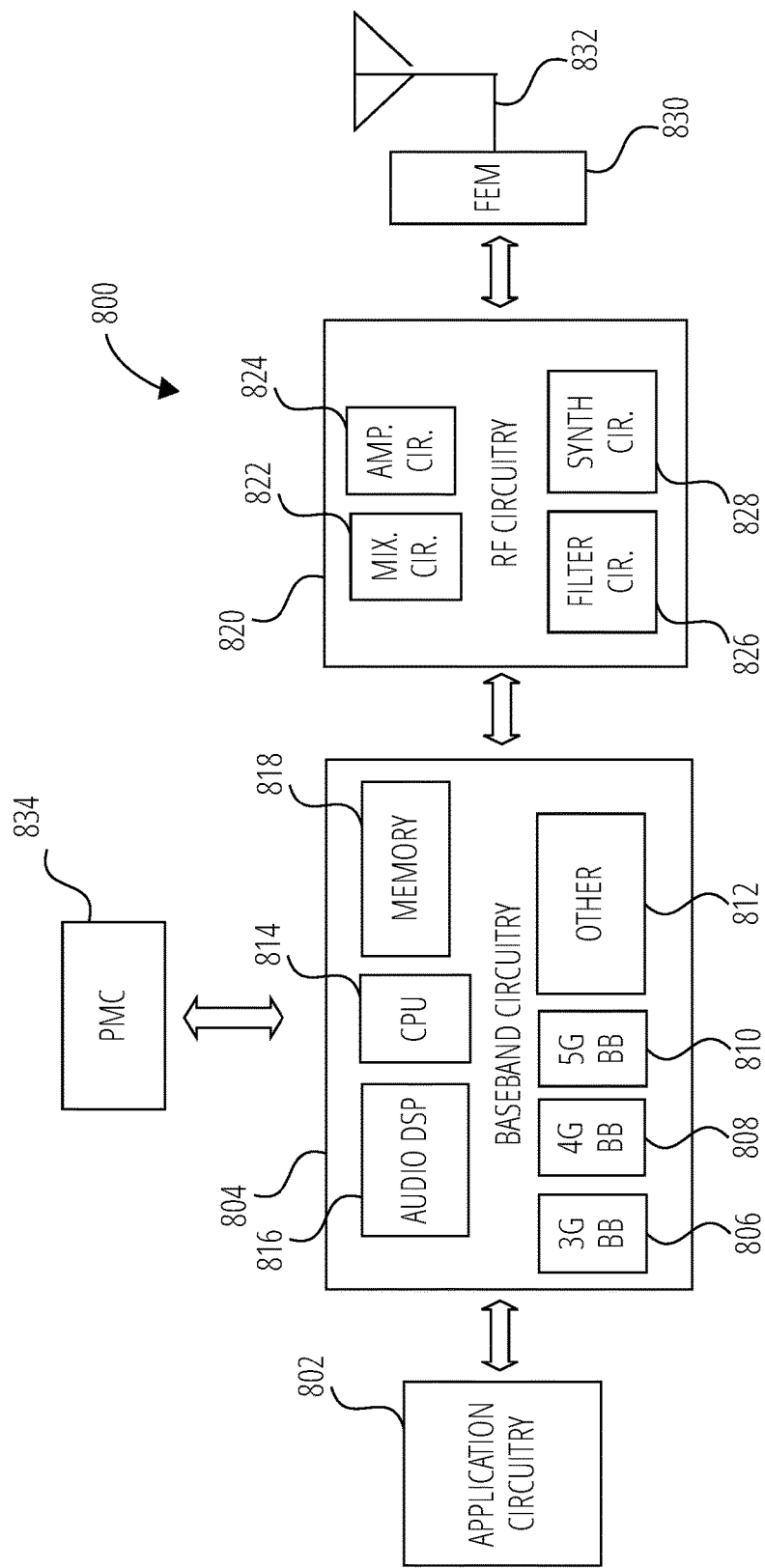
FIG. 8 illustrates a device in accordance with one embodiment.

FIG. 8 illustrates example components of a device 800 in accordance with some embodiments. In some embodiments, the device 800 may include application circuitry 802, baseband circuitry 804, Radio Frequency (RF) circuitry (shown as RF circuitry 820), front-end module (FEM) circuitry (shown as FEM circuitry 830), one or more antennas 832, and power management circuitry (PMC) (shown as PMC 834) coupled together at least as shown. The components of the illustrated device 800 may be included in a UE or a RAN node. In some embodiments, the device 800 may include fewer elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 820 and to generate baseband signals for a transmit signal path of the RF circuitry 820. The baseband circuitry 804 may interface with the application circuitry 802 for generation and processing of the baseband signals and for controlling operations of the RF circuitry 820. For example, in some embodiments, the baseband circuitry 804 may include a third generation (3G) baseband processor (3G baseband processor 806), a fourth generation (4G) baseband processor (4G baseband processor 808), a fifth generation (5G) baseband processor (5G baseband processor 810), or other baseband processor(s) 812 for other existing generations, generations in development or to be developed in the future (e.g., second generation (2G), sixth generation (6G), etc.). The baseband circuitry 804 (e.g., one or more of baseband processors) may handle various radio control functions that enable communication with one or more radio networks via the RF circuitry 820. In other embodiments, some or all of the functionality of the illustrated baseband processors may be included in modules stored in the memory 818 and executed via a Central Processing Unit (CPU 814). The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include a digital signal processor (DSP), such as one or more audio DSP(s) 816. The one or more audio DSP(s) 816 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

The RF circuitry 820 may enable communication with wireless networks using modulated electromagnetic radiation through a non-solid medium. In various embodiments, the RF circuitry 820 may include switches, filters, amplifiers, etc. to facilitate the communication with the wireless network. The RF circuitry 820 may include a receive signal path which may include circuitry to down-convert RF signals received from the FEM circuitry 830 and provide baseband signals to the baseband circuitry 804. The RF circuitry 820 may also include a transmit signal path which may include circuitry to up-convert baseband signals provided by the baseband circuitry 804 and provide RF output signals to the FEM circuitry 830 for transmission.

In some embodiments, the receive signal path of the RF circuitry 820 may include mixer circuitry 822, amplifier circuitry 824 and filter circuitry 826. In some embodiments, the transmit signal path of the RF circuitry 820 may include filter circuitry 826 and mixer circuitry 822. The RF circuitry 820 may also include synthesizer circuitry 828 for synthesizing a frequency for use by the mixer circuitry 822 of the receive signal path and the transmit signal path. In some embodiments, the mixer circuitry 822 of the receive signal path may be configured to down-convert RF signals received from the FEM circuitry 830 based on the synthesized frequency provided by synthesizer circuitry 828. The amplifier circuitry 824 may be configured to amplify the down-converted signals and the filter circuitry 826 may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, the mixer circuitry 822 of the receive signal path may comprise passive mixers, although the scope of the embodiments is not limited in this respect.

In some embodiments, the mixer circuitry 822 of the transmit signal path may be configured to up-convert input baseband signals based on the synthesized frequency provided by the synthesizer circuitry 828 to generate RF output signals for the FEM circuitry 830. The baseband signals may be provided by the baseband circuitry 804 and may be filtered by the filter circuitry 826.

In some embodiments, the mixer circuitry 822 of the receive signal path and the mixer circuitry 822 of the transmit signal path may include two or more mixers and may be arranged for quadrature downconversion and upconversion, respectively. In some embodiments, the mixer circuitry 822 of the receive signal path and the mixer circuitry 822 of the transmit signal path may include two or more mixers and may be arranged for image rejection (e.g., Hartley image rejection). In some embodiments, the mixer circuitry 822 of the receive signal path and the mixer circuitry 822 may be arranged for direct downconversion and direct upconversion, respectively. In some embodiments, the mixer circuitry 822 of the receive signal path and the mixer circuitry 822 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 820 may include analog-to-digital converter (ADC) and digital-to-analog converter (DAC) circuitry and the baseband circuitry 804 may include a digital baseband interface to communicate with the RF circuitry 820.

In some dual-mode embodiments, a separate radio IC circuitry may be provided for processing signals for each spectrum, although the scope of the embodiments is not limited in this respect.

In some embodiments, the synthesizer circuitry 828 may be a fractional-N synthesizer or a fractional N/N+1 synthesizer, although the scope of the embodiments is not limited in this respect as other types of frequency synthesizers may be suitable. For example, synthesizer circuitry 828 may be a delta-sigma synthesizer, a frequency multiplier, or a synthesizer comprising a phase-locked loop with a frequency divider.

The synthesizer circuitry 828 may be configured to synthesize an output frequency for use by the mixer circuitry 822 of the RF circuitry 820 based on a frequency input and a divider control input. In some embodiments, the synthesizer circuitry 828 may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 802 (such as an applications processor) depending on the desired output frequency. In some embodiments, a divider control input (e.g., N) may be determined from a look-up table based on a channel indicated by the application circuitry 802.

Synthesizer circuitry 828 of the RF circuitry 820 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 828 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 820 may include an IQ/polar converter.

The FEM circuitry 830 may include a receive signal path which may include circuitry configured to operate on RF signals received from one or more antennas 832, amplify the received signals and provide the amplified versions of the received signals to the RF circuitry 820 for further processing. The FEM circuitry 830 may also include a transmit signal path which may include circuitry configured to amplify signals for transmission provided by the RF circuitry 820 for transmission by one or more of the one or more antennas 832. In various embodiments, the amplification through the transmit or receive signal paths may be done solely in the RF circuitry 820, solely in the FEM circuitry 830, or in both the RF circuitry 820 and the FEM circuitry 830.

In some embodiments, the FEM circuitry 830 may include a TX/RX switch to switch between transmit mode and receive mode operation. The FEM circuitry 830 may include a receive signal path and a transmit signal path. The receive signal path of the FEM circuitry 830 may include an LNA to amplify received RF signals and provide the amplified received RF signals as an output (e.g., to the RF circuitry 820). The transmit signal path of the FEM circuitry 830 may include a power amplifier (PA) to amplify input RF signals (e.g., provided by the RF circuitry 820), and one or more filters to generate RF signals for subsequent transmission (e.g., by one or more of the one or more antennas 832).

In some embodiments, the PMC 834 may manage power provided to the baseband circuitry 804. In particular, the PMC 834 may control power-source selection, voltage scaling, battery charging, or DC-to-DC conversion. The PMC 834 may often be included when the device 800 is capable of being powered by a battery, for example, when the device 800 is included in a UE. The PMC 834 may increase the power conversion efficiency while providing desirable implementation size and heat dissipation characteristics.

FIG. 8 shows the PMC 834 coupled only with the baseband circuitry 804. However, in other embodiments, the PMC 834 may be additionally or alternatively coupled with, and perform similar power management operations for, other components such as, but not limited to, the application circuitry 802, the RF circuitry 820, or the FEM circuitry 830.

In some embodiments, the PMC 834 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used to execute Layer 3, Layer 2, or Layer 1 functionality, while processors of the application circuitry 802 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
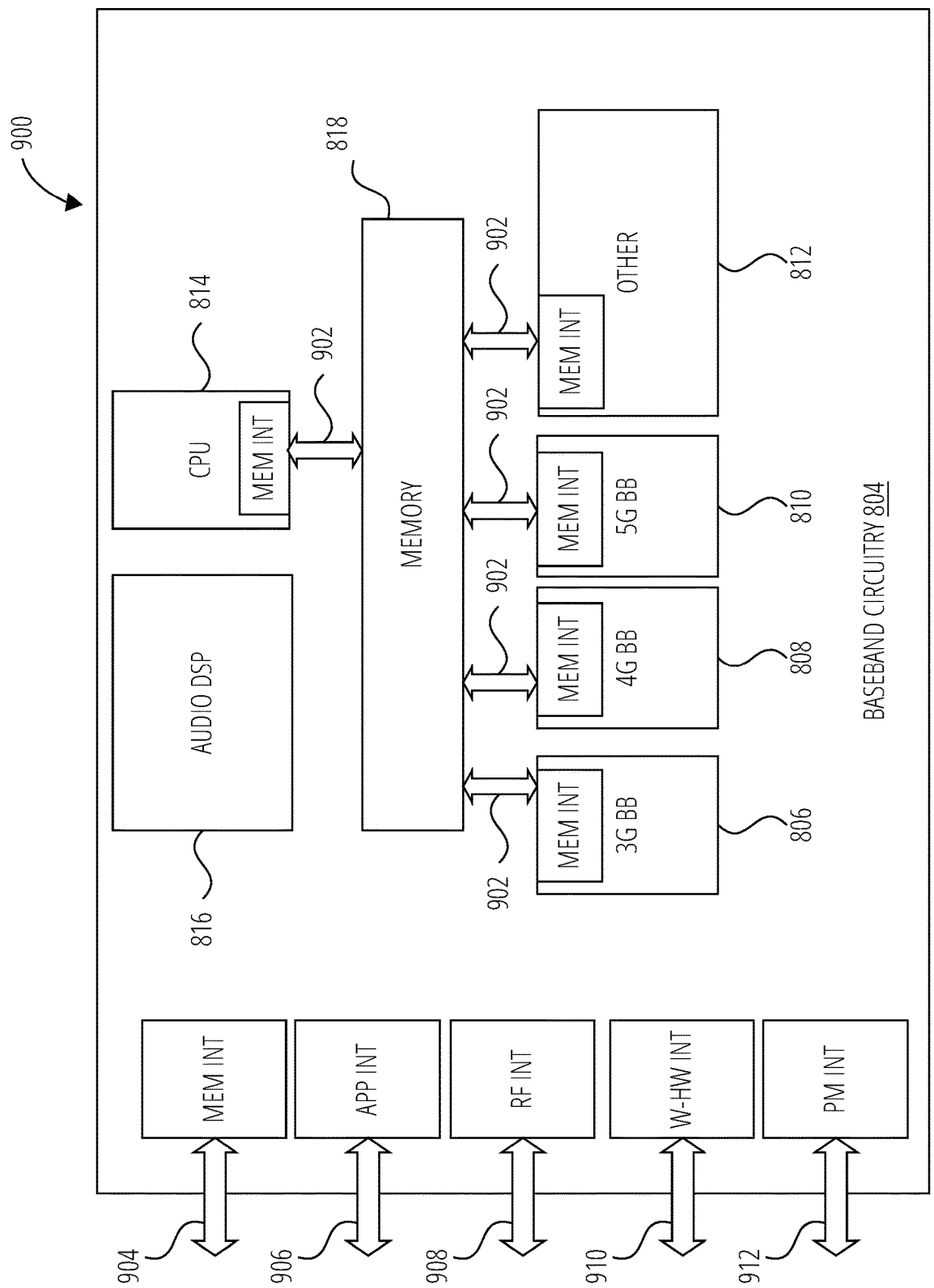
FIG. 9 illustrates example interfaces in accordance with one embodiment.

FIG. 9 illustrates example interfaces 900 of baseband circuitry in accordance with some embodiments. As discussed above, the baseband circuitry 804 of FIG. 8 may comprise 3G baseband processor 806, 4G baseband processor 808, 5G baseband processor 810, other baseband processor(s) 812, CPU 814, and a memory 818 utilized by said processors. As illustrated, each of the processors may include a respective memory interface 902 to send/receive data to/from the memory 818.

The baseband circuitry 804 may further include one or more interfaces to communicatively couple to other circuitries/devices, such as a memory interface 904 (e.g., an interface to send/receive data to/from memory external to the baseband circuitry 804), an application circuitry interface 906 (e.g., an interface to send/receive data to/from the application circuitry 802 of FIG. 8), an RF circuitry interface 908 (e.g., an interface to send/receive data to/from RF circuitry 820 of FIG. 8), a wireless hardware connectivity interface 910 (e.g., an interface to send/receive data to/from Near Field Communication (NFC) components, Bluetooth® components (e.g., Bluetooth® Low Energy), Wi-Fi® components, and other communication components), and a power management interface 912 (e.g., an interface to send/receive power or control signals to/from the PMC 834.

Figure 10:
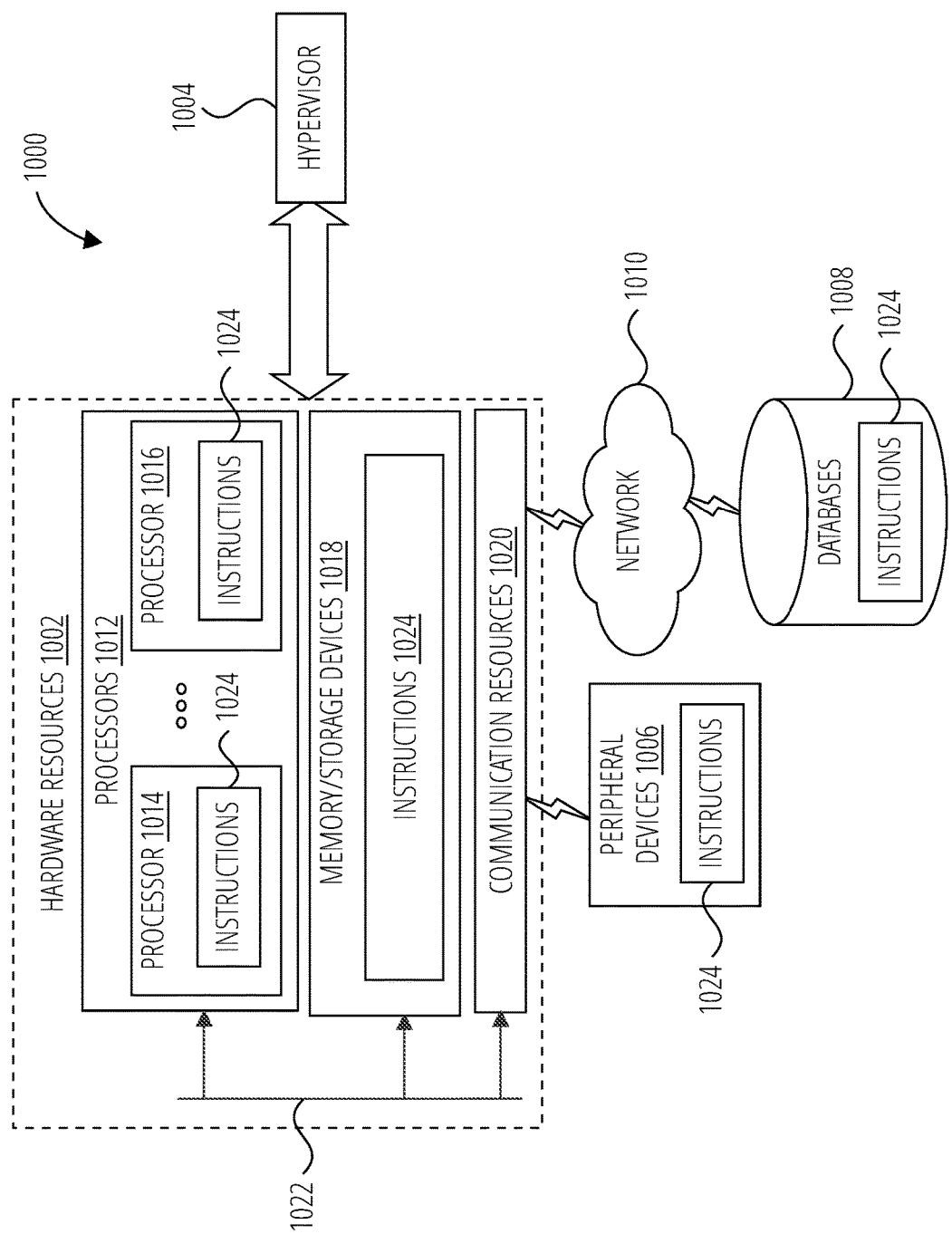
FIG. 10 illustrates components in accordance with one embodiment.

FIG. 10 is a block diagram illustrating components 1000, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1002 including one or more processors 1012 (or processor cores), one or more memory/storage devices 1018, and one or more communication resources 1020, each of which may be communicatively coupled via a bus 1022. For embodiments where node virtualization (e.g., NFV) is utilized, a hypervisor 1004 may be executed to provide an execution environment for one or more network slices/sub-slices to utilize the hardware resources 1002.

The processors 1012 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1014 and a processor 1016.

The memory/storage devices 1018 may include main memory, disk storage, or any suitable combination thereof. The memory/storage devices 1018 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1020 may include interconnection or network interface components or other suitable devices to communicate with one or more peripheral devices 1006 or one or more databases 1008 via a network 1010. For example, the communication resources 1020 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1024 may comprise software, a program, an application, an applet, an app, or other executable code for causing at least any of the processors 1012 to perform any one or more of the methodologies discussed herein. The instructions 1024 may reside, completely or partially, within at least one of the processors 1012 (e.g., within the processor's cache memory), the memory/storage devices 1018, or any suitable combination thereof. Furthermore, any portion of the instructions 1024 may be transferred to the hardware resources 1002 from any combination of the peripheral devices 1006 or the databases 1008. Accordingly, the memory of the processors 1012, the memory/storage devices 1018, the peripheral devices 1006, and the databases 1008 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples Section

The following examples pertain to further embodiments.

Example 1 may include a method for scheduling a sidelink (SL) transmission, comprising: receiving, at a Next Generation Node B (gNB) from a user equipment (UE), a minimum time gap for use by the UE between a reception at the UE of a Downlink Control Information (DCI) message that triggers the SL transmission and a sending of the SL transmission by the UE; determining, at the gNB, an offset from the reception of the DCI message at the UE for the UE to use to schedule the SL transmission, the offset based on the minimum time gap; generating, at the gNB, the DCI message, the DCI message including a field indicating the offset; and sending, from the gNB, the DCI message to the UE.

Example 2 may include the method of example 1, further comprising: generating, at the gNB, an RRC message including a mapping to separate an encoding of the offset with an SL time domain resource allocation (TDRA) within the field indicating the offset; and sending, from the gNB, the RRC message to the UE.

Example 3 may include the method of example 2, wherein the mapping includes a table.

Example 4 may include the method any of examples 1-3, wherein the offset is provided as a separate bit field within the DCI message.

Example 5 may include the method of any of examples 1-3, wherein the offset is a time that is greater than or equal to a Physical Sidelink Control Channel (PSCCH)/Physical Sidelink Shared Channel (PSSCH) preparation time in a given processing capability of the UE.

Example 6 may include the method of any of examples 1-3, wherein the offset is in terms of one of slots and symbols.

Example 7 may include the method of any of examples 1-6, wherein the DCI message is formatted for one or more of a Control Resource Set (CORESET), a search space, a periodicity of monitoring, and a number of candidates per aggregation level.

Example 8 may include the method of any of examples 1-7, wherein the minimum time gap for use by the UE is a cross-Radio Access Technology (RAT) scheduling delay at the UE.

Example 9 may include a method for scheduling a sidelink (SL) transmission, comprising: receiving, at a Next Generation Node B (gNB) from a user equipment (UE), a minimum time gap for use by the UE between a reception at the UE of a configuring message that configures a sending of the SL transmission by the UE and the sending of the SL transmission by the UE; determining, at the gNB, timing information for the UE to use to schedule the SL transmission, the timing information based on the minimum time gap; generating, at the gNB, the configuring message including a field indicating the timing information; and sending, from the gNB, the configuring message to the UE.

Example 10 may include the method of example 9, further comprising: generating, at the gNB, a DCI message that triggers the SL transmission; and sending, from the gNB, the DCI message to the UE after the configuring message is sent.

Example 11 may include the method of example 10, wherein the DCI message is formatted for one or more of a Control Resource Set (CORESET), a search space, a periodicity of monitoring, and a number of candidates per aggregation level.

Example 12 may include the method of example 9, wherein the configuring message is an RRC message.

Example 13 may include the method of any of examples 9-12, wherein the timing information is an offset for an amount of time that is greater than or equal to a Physical Sidelink Control Channel (PSCCH)/Physical Sidelink Shared Channel (PSSCH) preparation time in a given processing capability of the UE.

Example 14 may include the method of any of examples 9-12, wherein the timing information is an offset in terms of one or more of slots and symbols.

Example 15 may include the method of any of examples 9-12, wherein the timing information is an offset relative to one of a Direct Frame Number (DFN) and a System Frame Number (SFN).

Example 16 may include the method of any of examples 9-15, wherein the minimum time gap for use by the UE is a cross-Radio Access Technology (RAT) scheduling delay at the UE.

Example 17 may include the method of any of examples 9-16, wherein the configuring message further indicates an absolute time of activity for resources configured by the configuring message.

Example 18 may include the method of any of examples 9-16, wherein the configuring message further indicates a number of Physical Sidelink Control Channel (PSCCH)/Physical Sidelink Shared Channel (PSSCH) occasions after the reception of the configuring message for which resources configured by the configuring message are active.

Example 19 may include a method for scheduling a sidelink (SL) transmission, comprising: determining, at user equipment (UE), a minimum time gap for use by the UE between a reception at the UE of a Downlink Control Information (DCI) message from a Next Generation Node B (gNB) that triggers the SL transmission and a sending of the SL transmission by the UE; sending, from the UE to the gNB, the minimum time gap; receiving, at the UE from the gNB, the DCI message, the DCI message including a field indicating an offset from the reception of the DCI message for the UE to use to schedule the SL transmission, the offset based on the minimum time gap; and scheduling, at the UE, the SL transmission triggered by the DCI message according to the offset.

Example 20 may include the method of example 19, further comprising: receiving, at the UE, an RRC message including a mapping to separate an encoding of the offset with an SL time domain resource allocation (TDRA) within the field indicating the offset; and separating, at the UE, the offset and the SL TDRA according to the mapping.

Example 21 may include the method of example 20, wherein the mapping includes a table.

Example 22 may include the method of any of examples 19-22, wherein the offset is provided as a separate bit field within the DCI message.

Example 23 may include the method of any of examples 19-22, wherein the offset is a time that is greater than or equal to a Physical Sidelink Control Channel (PSCCH)/Physical Sidelink Shared Channel (PSSCH) preparation time in a given processing capability of the UE.

Example 24 may include the method of any of examples 19-22, wherein the offset is in terms of slots.

Example 25 may include the method of example 24, wherein if the offset points to a slot without available SL symbols, the UE transmits in a first slot with available SL symbols after the slot without available SL symbols.

Example 26 may include the method of any of examples 19-22, wherein the offset is in terms of symbols.

Example 27 may include the method of any one of examples 19-26, wherein the DCI message is formatted for one or more of a Control Resource Set (CORESET), a search space, a periodicity of monitoring, and a number of candidates per aggregation level.

Example 28 may include the method of any one of examples 19-27, wherein the minimum time gap for use by the UE is a cross-Radio Access Technology (RAT) scheduling delay at the UE.

Example 29 may include method for scheduling a sidelink (SL) transmission, comprising: determining, at user equipment (UE), a minimum time gap for use by the UE between a reception at the UE of a configuring message from a Next Generation Node B (gNB) that configures a sending of the SL transmission and the sending of the SL transmission by the UE; sending, from the UE to the gNB, the minimum time gap; receiving, at the UE from the gNB, the configuring message, the configuring message including a field indicating timing information based on the minimum time gap; and scheduling, at the UE, the SL transmission based on the timing information.

Example 30 may include the method of example 29, further comprising receiving, at the UE, a DCI message that triggers the SL transmission, wherein the SL transmission is further scheduled in response to receiving the DCI message.

Example 31 may include the method of example 30, wherein the DCI message is formatted for one or more of a Control Resource Set (CORESET), a search space, a periodicity of monitoring, and a number of candidates per aggregation level.

Example 32 may include the example of claim 29, wherein the configuring message is an RRC message.

Example 33 may include the method of any of examples 29-32, wherein the timing information is an offset for an amount of time that is greater than or equal to a Physical Sidelink Control Channel (PSCCH)/Physical Sidelink Shared Channel (PSSCH) preparation time in a given processing capability of the UE.

Example 34 may include the method of any of examples 29-32, wherein the timing information is an offset is in terms of one of slots and symbols.

Example 35 may include the method of any of examples 29-32, wherein the timing information is an offset relative to one of a Direct Frame Number (DFN) and a System Frame Number (SFN).

Example 36 may include the method of any of examples 29-33, wherein the minimum time gap for use by the UE is a cross-Radio Access Technology (RAT) scheduling delay at the UE.

Example 37 may include the method of any of examples 29-34, wherein the configuring message further indicates an absolute time of activity for resources configured by the configuring message.

Example 38 may include the method of any of examples 29-34, wherein the configuring message further indicates a number of Physical Sidelink Control Channel (PSCCH)/Physical Sidelink Shared Channel (PSSCH) occasions after the reception of the configuring message for which resources configured by the configuring message are active.

Example 39 may include a computing apparatus at a Next Generation Node B (gNB), the computing apparatus comprising: a processor; and a memory storing instructions that, when executed by the processor, configure the computing apparatus to: identify, at the computing apparatus, a minimum time gap for use by a UE between a reception at the UE of a Downlink Control Information (DCI) message that triggers an SL transmission and a sending of the SL transmission by the UE; determine, at the computing apparatus, an offset from the reception of the DCI message at the UE for the UE to use to schedule the SL transmission, the offset based on the minimum time gap; and generate, at the computing apparatus, the DCI message, the DCI message including a field indicating the offset.

Example 40 may include the computing apparatus of example 39, the memory further storing instructions that, when executed by the processor, configure the computing apparatus to generate, at the computing apparatus, an RRC message including a mapping to separate an encoding of the offset with an SL time domain resource allocation (TDRA) within the field indicating the offset.

Example 41 may include the computing apparatus of example 40, wherein the mapping includes a table.

Example 42 may include the computing apparatus of any of examples 39-41, wherein the offset is provided as a separate bit field within the DCI message.

Example 43 may include the computing apparatus of any of examples 39-41, wherein the offset is a time that is greater than or equal to a Physical Sidelink Control Channel (PSCCH)/Physical Sidelink Shared Channel (PSSCH) preparation time in a given processing capability of the UE.

Example 44 may include the computing apparatus of any of examples 39-41, wherein the offset is in terms of one of slots and symbols.

Example 45 may include the computing apparatus of any of examples 39-44, wherein the DCI message is formatted for one or more of a Control Resource Set (CORESET), a search space, a periodicity of monitoring, and a number of candidates per aggregation level.

Example 46 may include the computing apparatus of any of examples 39-45, wherein the minimum time gap for use by the UE is a cross-Radio Access Technology (RAT) scheduling delay at the UE.

Example 47 may include a computing apparatus of a Next Generation Node B (gNB), the computing apparatus comprising: a processor; and a memory storing instructions that, when executed by the processor, configure the computing apparatus to: identify, at the computing apparatus, a minimum time gap for use by a UE between a reception at the UE of a configuring message that configures a sending of an SL transmission by the UE and the sending of the SL transmission by the UE; determine, at the computing apparatus, timing information for the UE to use to schedule the SL transmission, the timing information based on the minimum time gap; and generate, at the computing apparatus, the configuring message including a field indicating the timing information.

Example 48 may include the computing apparatus of example 47, the memory further storing instructions that, when executed by the processor, configure the computing apparatus to generate a DCI message that triggers the SL transmission.

Example 49 may include the computing apparatus of example 48, wherein the DCI message is formatted for one or more of a Control Resource Set (CORESET), a search space, a periodicity of monitoring, and a number of candidates per aggregation level.

Example 50 may include the computing apparatus of example 47, wherein the configuring message is an RRC message.

Example 51 may include the computing apparatus of any of examples 47-50, wherein the timing information is an offset for an amount of time that is greater than or equal to a Physical Sidelink Control Channel (PSCCH)/Physical Sidelink Shared Channel (PSSCH) preparation time in a given processing capability of the UE.

Example 52 may include the computing apparatus of any of examples 47-50, wherein the timing information is an offset in terms of one or more of slots and symbols.

Example 54 may include the computing apparatus of any of examples 47-50, wherein the timing information is an offset relative to one of a Direct Frame Number (DFN) and a System Frame Number (SFN).

Example 54 may include the computing apparatus of any of examples 47-53, wherein the minimum time gap for use by the UE is a cross-Radio Access Technology (RAT) scheduling delay at the UE.

Example 55 may include the computing apparatus of any of examples 47-54, wherein the configuring message further indicates an absolute time of activity for resources configured by the configuring message.

Example 56 may include the computing apparatus of any of examples 47-54, wherein the configuring message further indicates a number of Physical Sidelink Control Channel (PSCCH)/Physical Sidelink Shared Channel (PSSCH) occasions after the reception of the configuring message for which resources configured by the configuring message are active.

Example 57 may include a computing apparatus of a user equipment (UE), the computing apparatus comprising: a processor; and a memory storing instructions that, when executed by the processor, configure the computing apparatus to: determine, at the computing apparatus, a minimum time gap for use by the computing apparatus between a reception of a Downlink Control Information (DCI) message from a Next Generation Node B (gNB) that triggers an SL transmission and a sending of the SL transmission; process, at the computing apparatus, the DCI message from the gNB, the DCI message including a field indicating an offset from the reception of the DCI message for the UE to use to schedule the SL transmission, the offset based on the minimum time gap; and schedule, at the computing apparatus, the SL transmission triggered by the DCI message according to the offset.

Example 58 may include the computing apparatus of claim 57, the memory further storing instructions that, when executed by the processor, configure the computing apparatus to: process, at the computing apparatus, an RRC message including a mapping to separate an encoding of the offset with an SL time domain resource allocation (TDRA) within the field indicating the offset; and separate, at the computing apparatus, the offset and the SL TDRA according to the mapping.

Example 59 may include the computing apparatus of example 58, wherein the mapping includes a table.

Example 60 may include the computing apparatus of any of examples 57-59, wherein the offset is provided as a separate bit field within the DCI message.

Example 61 may include the computing apparatus of any of examples 57-59, wherein the offset is a time that is greater than or equal to a Physical Sidelink Control Channel (PSCCH)/Physical Sidelink Shared Channel (PSSCH) preparation time in a given processing capability of the UE.

Example 62 may include the computing apparatus of any of examples 57-59, wherein the offset is in terms of slots.

Example 63 may include the computing apparatus of example 62, wherein if the offset points to a slot without available SL symbols, the UE transmits in a first slot with available SL symbols after the slot without available SL symbols.

Example 64 may include the computing apparatus of any of examples 57-59, wherein the offset is in terms of symbols.

Example 65 may include the computing apparatus of any one of examples 57-64, wherein the DCI message is formatted for one or more of a Control Resource Set (CORESET), a search space, a periodicity of monitoring, and a number of candidates per aggregation level.

Example 66 may include the computing apparatus of any of examples 57-65, wherein the minimum time gap for use by the UE is a cross-Radio Access Technology (RAT) scheduling delay at the UE.

Example 67 may include a computing apparatus of a user equipment (UE), the computing apparatus comprising: a processor; and a memory storing instructions that, when executed by the processor, configure the computing apparatus to: determine, at the computing apparatus, a minimum time gap for use by the computing apparatus between a reception of a configuring message from a Next Generation Node B (gNB) that configures a sending of an SL transmission and the sending of the SL transmission; process, at the computing apparatus, the configuring message from the gNB, the configuring message including a field indicating timing information based on the minimum time gap; and schedule, at the computing apparatus, the SL transmission based on the timing information.

Example 68 may include the computing apparatus of example 67, the memory further storing instructions that, when executed by the processor, configure the computing apparatus to process a DCI message that triggers the SL transmission, wherein the SL transmission is further scheduled in response to receiving the DCI message.

Example 69 may include the computing apparatus of example 68, wherein the DCI message is formatted for one or more of a Control Resource Set (CORESET), a search space, a periodicity of monitoring, and a number of candidates per aggregation level.

Example 70 may include the computing apparatus of example 67, wherein the configuring message is an RRC message.

Example 71 may include the computing apparatus of any of examples 67-70, wherein the timing information is an offset for an amount of time that is greater than or equal to a Physical Sidelink Control Channel (PSCCH)/Physical Sidelink Shared Channel (PSSCH) preparation time in a given processing capability of the UE.

Example 72 may include the computing apparatus of any of examples 67-70, wherein the timing information is an offset is in terms of one of slots and symbols.

Example 73 may include the computing apparatus of any of examples 67-70, wherein the timing information is an offset relative to one of a Direct Frame Number (DFN) and a System Frame Number (SFN).

Example 74 may include the computing apparatus of any of examples 67-73, wherein the minimum time gap for use by the UE is a cross-Radio Access Technology (RAT) scheduling delay at the UE.

Example 75 may include the computing apparatus of any of examples 67-74, wherein the configuring message further indicates an absolute time of activity for resources configured by the configuring message.

Example 76 may include the computing apparatus of any of examples 67-74, wherein the configuring message further indicates a number of Physical Sidelink Control Channel (PSCCH)/Physical Sidelink Shared Channel (PSSCH) occasions after the reception of the configuring message for which resources configured by the configuring message are active.

Example 77 may include a non-transitory computer-readable storage medium, the computer-readable storage medium including instructions that when executed by a computer, cause the computer to: identify a minimum time gap for use by a UE between a reception at the UE of a Downlink Control Information (DCI) message that triggers an SL transmission and a sending of the SL transmission by the UE; determine an offset from the reception of the DCI message at the UE for the UE to use to schedule the SL transmission, the offset based on the minimum time gap; and generate the DCI message, the DCI message including a field indicating the offset.

Example 78 may include the non-transitory computer-readable storage medium of example 77, the computer-readable storage medium further including instructions that when executed by a computer, cause the computer to generate an RRC message including a mapping to separate an encoding of the offset with an SL time domain resource allocation (TDRA) within the field indicating the offset.

Example 79 may include the non-transitory computer-readable storage medium of example 78, wherein the mapping includes a table.

Example 80 may include the non-transitory computer-readable storage medium of any of examples 77-79, wherein the offset is provided as a separate bit field within the DCI message.

Example 81 may include the non-transitory computer-readable storage medium of any of examples 77-79, wherein the offset is a time that is greater than or equal to a Physical Sidelink Control Channel (PSCCH)/Physical Sidelink Shared Channel (PSSCH) preparation time in a given processing capability of the UE.

Example 82 may include the non-transitory computer-readable storage medium of any of examples 77-79, wherein the offset is in terms of one of slots and symbols.

Example 83 may include the non-transitory computer-readable storage medium of any of examples 77-82, wherein the DCI message is formatted for one or more of a Control Resource Set (CORESET), a search space, a periodicity of monitoring, and a number of candidates per aggregation level.

Example 84 may include the non-transitory computer-readable storage medium of any of examples 77-83, wherein the minimum time gap for use by the UE is a cross-Radio Access Technology (RAT) scheduling delay at the UE.

Example 85 may include a non-transitory computer-readable storage medium, the computer-readable storage medium including instructions that when executed by a computer, cause the computer to: identify a minimum time gap for use by a UE between a reception at the UE of a configuring message that configures a sending of an SL transmission by the UE and the sending of the SL transmission by the UE; determine timing information for the UE to use to schedule the SL transmission, the timing information based on the minimum time gap; and generate the configuring message including a field indicating the timing information.

Example 86 may include the non-transitory computer-readable storage medium of example 85, the computer-readable storage medium further including instructions that when executed by a computer, cause the computer to generate, at the gNB, a DCI message that triggers the SL transmission.

Example 87 may include the non-transitory computer-readable storage medium of example 86, wherein the DCI message is formatted for one or more of a Control Resource Set (CORESET), a search space, a periodicity of monitoring, and a number of candidates per aggregation level.

Example 88 may include the non-transitory computer-readable storage medium of example 85, wherein the configuring message is an RRC message.

Example 89 may include the non-transitory computer-readable storage medium of any of examples 85-88, wherein the timing information is an offset for an amount of time that is greater than or equal to a Physical Sidelink Control Channel (PSCCH)/Physical Sidelink Shared Channel (PSSCH) preparation time in a given processing capability of a UE.

Example 90 may include the non-transitory computer-readable storage medium of any of examples 85-88, wherein the timing information is an offset in terms of one or more of slots and symbols.

Example 91 may include the non-transitory computer-readable storage medium of any of examples 85-88, wherein the timing information is an offset relative to one of a Direct Frame Number (DFN) and a System Frame Number (SFN).

Example 92 may include the non-transitory computer-readable storage medium of any of examples 85-91, wherein the minimum time gap for use by the UE is a cross-Radio Access Technology (RAT) scheduling delay at the UE.

Example 93 may include the non-transitory computer-readable storage medium of any of examples 85-92, wherein the configuring message further indicates an absolute time of activity for resources configured by the configuring message.

Example 94 may include the non-transitory computer-readable storage medium of any of examples 85-92, wherein the configuring message further indicates a number of Physical Sidelink Control Channel (PSCCH)/Physical Sidelink Shared Channel (PSSCH) occasions after the reception of the configuring message for which resources configured by the configuring message are active.

Example 95 may include a non-transitory computer-readable storage medium, the computer-readable storage medium including instructions that when executed by a computer, cause the computer to: determine a minimum time gap between a reception of a Downlink Control Information (DCI) message from a Next Generation Node B (gNB) that triggers an SL transmission and a sending of the SL transmission; process the DCI message, the DCI message including a field indicating an offset from the reception of the DCI message to use to schedule the SL transmission, the offset based on the minimum time gap; and schedule the SL transmission triggered by the DCI message according to the offset.

Example 96 may include the non-transitory computer-readable storage medium of example 95, the computer-readable storage medium further including instructions that when executed by a computer, cause the computer to: process an RRC message including a mapping to separate an encoding of the offset with an SL time domain resource allocation (TDRA) within the field indicating the offset; and separate the offset and the SL TDRA according to the mapping.

Example 97 may include the non-transitory computer-readable storage medium of example 96, wherein the mapping includes a table.

Example 98 may include the non-transitory computer-readable storage medium of any of examples 95-97, wherein the offset is provided as a separate bit field within the DCI message.

Example 99 may include the non-transitory computer-readable storage medium of any of examples 95-97, wherein the offset is a time that is greater than or equal to a Physical Sidelink Control Channel (PSCCH)/Physical Sidelink Shared Channel (PSSCH) preparation time in a given processing capability of a UE.

Example 100 may include the non-transitory computer-readable storage medium of any of examples 95-97, wherein the offset is in terms of slots.

Example 101 may include the non-transitory computer-readable storage medium of example 100, wherein if the offset points to a slot without available SL symbols, the UE transmits in a first slot with available SL symbols after the slot without available SL symbols.

Example 102 may include the non-transitory computer-readable storage medium of any of examples 95-97, wherein the offset is in terms of symbols.

Example 103 may include the non-transitory computer-readable storage medium of any of examples 95-102, wherein the DCI message is formatted for one or more of a Control Resource Set (CORESET), a search space, a periodicity of monitoring, and a number of candidates per aggregation level.

Example 104 may include the non-transitory computer-readable storage medium of any of examples 95-103, wherein the minimum time gap for use by the UE is a cross-Radio Access Technology (RAT) scheduling delay at the UE.

Example 105 may include a non-transitory computer-readable storage medium, the computer-readable storage medium including instructions that when executed by a computer, cause the computer to: determine a minimum time gap between a reception of a configuring message from a Next Generation Node B (gNB) that configures a sending of an SL transmission and the sending of the SL transmission; process the configuring message, the configuring message including a field indicating timing information based on the minimum time gap; and schedule the SL transmission based on the timing information.

Example 106 may include the non-transitory computer-readable storage medium of example 105, the computer-readable storage medium further including instructions that when executed by a computer, cause the computer to process a DCI message that triggers the SL transmission, wherein the SL transmission is further scheduled in response to receiving the DCI message.

Example 107 may include the non-transitory computer-readable storage medium of example 106, wherein the DCI message is formatted for one or more of a Control Resource Set (CORESET), a search space, a periodicity of monitoring, and a number of candidates per aggregation level.

Example 108 may include the non-transitory computer-readable storage medium of example 105, wherein the configuring message is an RRC message.

Example 109 may include the non-transitory computer-readable storage medium of any of examples 105-108, wherein the timing information is an offset for an amount of time that is greater than or equal to a Physical Sidelink Control Channel (PSCCH)/Physical Sidelink Shared Channel (PSSCH) preparation time in a given processing capability of a UE.

Example 110 may include the non-transitory computer-readable storage medium of any of examples 105-108, wherein the timing information is an offset is in terms of one of slots and symbols.

Example 111 may include the non-transitory computer-readable storage medium of any of examples 105-108, wherein the timing information is an offset relative to one of a Direct Frame Number (DFN) and a System Frame Number (SFN).

Example 112 may include the non-transitory computer-readable storage medium of any of example 105-111, wherein the minimum time gap for use by the UE is a cross-Radio Access Technology (RAT) scheduling delay at the UE.

Example 113 may include the non-transitory computer-readable storage medium of any of examples 105-112, wherein the configuring message further indicates an absolute time of activity for resources configured by the configuring message.

Example 114 may include the non-transitory computer-readable storage medium of any of claims 105-112, wherein the configuring message further indicates a number of Physical Sidelink Control Channel (PSCCH)/Physical Sidelink Shared Channel (PSSCH) occasions after the reception of the configuring message for which resources configured by the configuring message are active.

Example 115 may include a method of network controlled SL transmission in NR comprising:
  A DCI format transmission, by a gNB, scheduling an SL transmission by a UE with a time gap relative to the DCI reception time instance, and/or
  An RRC message signaling, by a gNB, scheduling an SL transmission by a UE with a time gap relative to the instance of the RRC message reception.

Example 116 may include the method of example 115 or some other example herein, wherein the DCI scheduling SL transmission is size-matched with one of the other formats to be monitored for Uu operation (formats 0_0, 0_1, 1_0, 1_1, etc.).

Example 117 may include the method of example 115 or some other example herein, wherein the DCI format for an SL grant is configured with a CORESET, a search space, periodicity of monitoring, and/or a number of candidates per aggregation level.

Example 118 may include the method of example 115 or some other example herein, wherein a timing offset between a DCI reception instance and an SL transmission, a K3, is conveyed in the DCI content scheduling the SL transmission.

Example 119 may include the method of example 118 or some other example herein, wherein the K3 is explicitly encoded as a separate bit-field.

Example 120 may include the method of example 118 or some other example herein, wherein the K3 is jointly encoded with an SL time domain resource allocation (TDRA) indication, where a mapping from the joint indication to separate the K3 and SL TDRA may be provided in RRC message as a table.

Example 120 may include the method of example 115 or some other example herein, wherein a timing offset between the DCI reception instance and the SL transmission, a K3, may be configured by an RRC message.

Example 121 may include the method of example 115 or some other example herein, wherein if the K3 points to a slot without available SL symbol(s), a UE is expected to transmit in a first slot with available SL symbol(s) after the slot pointed by the K3.

Example 122 may include the method of example 115 or some other example herein, wherein a UE is not expected to be scheduled with a K3 value less than the minimum PSCCH/PSSCH preparation time in a given processing capability.

Example 123 may include the method of example 122 or some other example herein, wherein the PSCCH/PSSCH preparation time may follow same values per SCS as Tproc,2 PUSCH preparation time, since PSSCH preparation and SL grant decoding should take a similar amount of time as PUSCH preparation+UL grant decoding.

Example 124 may include the method of example 115 or some other example herein, wherein an RRC message conveys a number of PSCCH/PSSCH occasions which are active after the reception of the RRC message.

Example 125 may include the method of example 115 or some other example herein, wherein a UE may report a minimum time gap between an instance of an RRC message reception in NR Uu and an SL transmission according to this message in LTE.

Example 126 may include the method of example 115 or some other example herein, wherein a UE may report a cross-RAT scheduling delay as a time gap between an instance of DCI reception in NR Uu and an SL transmission according to this DCI.

Example 127 may include a method comprising: receiving downlink control information (DCI) that schedules an SL transmission, the DCI including a field to indicate a timing offset from a reception time of the DCI for the UE to use for the SL transmission; and transmitting or causing to transmit the SL transmission based on the timing offset.

Example 128 may include the method of example 127 or another example herein, wherein the field includes a K3 value.

Example 129 may include the method of example 127-128 or another example herein, wherein the SL transmission is transmitted in an earliest slot with available SL symbols after the timing offset.

Example 130 may include the method of example 127-129 or another example herein, wherein the timing offset is a number of slots.

Example 131 may include the method of example 127-130 or another example herein, wherein the timing offset is a number of symbols.

Example 132 may include the method of example 127-131 or another example herein, wherein the method is performed by a UE or a portion thereof.

Example 133 may include a method comprising: determining a minimum time gap for a UE between a reception of an RRC message and a related SL transmission; and transmitting or causing to transmit the minimum time gap to a gNB.

Example 134 may include the method of example 133 or another example herein, wherein the minimum time gap is transmitted to the gNB by the UE as part of UE assistance signaling.

Example 135 may include the method of example 133-134 or another example herein, further comprising receiving an RRC message including configuration information for an SL transmission based on the minimum time gap.

Example 136 may include the method of example 133-135 or another example herein, wherein the method is performed by a UE or a portion thereof.

Example 137 may include a method comprising: determining a time gap for use by a UE between reception of a DCI message that schedules an SL transmission and transmission of the SL transmission; and transmitting or causing to transmit the minimum time gap to a gNB.

Example 138 may include the method of example 137 or another example herein, wherein the time gap is transmitted to the gNB by the UE as part of UE assistance signaling.

Example 139 may include the method of example 137-138 or another example herein, further comprising receiving a DCI message that schedules an SL transmission according to the time gap.

Example 140 may include the method of example 137-139 or another example herein, wherein the time gap corresponds to a cross-RAT scheduling delay.

Example 141 may include the method of example 137-140 or another example herein, wherein the method is performed by a UE or a portion thereof.

Example 142 may include an apparatus comprising means to perform one or more elements of a method described in or related to any of the above Examples, or any other method or process described herein.

Example 143 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 144 may include an apparatus comprising logic, modules, or circuitry to perform one or more elements of a method described in or related to any of the above Examples, or any other method or process described herein.

Example 145 may include a method, technique, or process as described in or related to any of the above Examples, or portions or parts thereof.

Example 146 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 147 may include a signal as described in or related to any of the above Examples, or portions or parts thereof.

Example 148 may include a datagram, packet, frame, segment, protocol data unit (PDU), or message as described in or related to any of the above Examples, or portions or parts thereof, or otherwise described in the present disclosure.

Example 149 may include a signal encoded with data as described in or related to any of the above Examples, or portions or parts thereof, or otherwise described in the present disclosure.

Example 150 may include a signal encoded with a datagram, packet, frame, segment, PDU, or message as described in or related to any of the above Examples, or portions or parts thereof, or otherwise described in the present disclosure.

Example 151 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 152 may include a computer program comprising instructions, wherein execution of the program by a processing element is to cause the processing element to carry out the method, techniques, or process as described in or related to any of the above Examples, or portions thereof.

Example 153 may include a signal in a wireless network as shown and described herein.

Example 154 may include a method of communicating in a wireless network as shown and described herein.

Example 155 may include a system for providing wireless communication as shown and described herein.

Example 156 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A computing apparatus of a base station, the computing apparatus comprising:
    a processor; and
    a memory storing instructions that, when executed by the processor, configure the computing apparatus to:
    identify, at the computing apparatus, a minimum time gap for use by a user equipment (UE) between a reception at the UE of a configuring message that configures a sending of a sidelink (SL) transmission by the UE and the sending of the SL transmission by the UE;
    determine, at the computing apparatus, based on the minimum time gap, timing information for the UE to use to schedule the SL transmission; and
    generate, at the computing apparatus, the configuring message including a field indicating the timing information, wherein the configuring message further indicates a number of Physical Sidelink Control Channel (PSCCH)/Physical Sidelink Shared Channel (PSSCH) occasions after the reception of the configuring message for which resources configured by the configuring message are active.

2. The computing apparatus of claim 1, the memory further storing instructions that, when executed by the processor, configure the computing apparatus to generate a downlink control information (DCI) message that triggers the SL transmission.

3. The computing apparatus of claim 1, wherein the timing information is an offset for an amount of time that is greater than or equal to a PSCCH/PSSCH preparation time in a given processing capability of the UE.

4. The computing apparatus of claim 1, wherein the timing information is an offset in terms of one or more of slots and symbols.

5. The computing apparatus of claim 1, wherein the timing information is an offset relative to one of a Direct Frame Number (DFN) and a System Frame Number (SFN).

6. The computing apparatus of claim 1, wherein the minimum time gap for use by the UE is a cross-Radio Access Technology (RAT) scheduling delay at the UE.

7. The computing apparatus of claim 1, wherein the configuring message further indicates an absolute time of activity for the resources configured by the configuring message.

8. A computing apparatus of a user equipment (UE), the computing apparatus comprising:
    a processor; and
    a memory storing instructions that, when executed by the processor, configure the computing apparatus to:
    determine, at the computing apparatus, a minimum time gap for use by the computing apparatus between a reception of a configuring message from a base station that configures a sending of a sidelink (SL) transmission and the sending of the SL transmission;
    send, to the base station, the minimum time gap;
    process, at the computing apparatus, the configuring message from the base station, the configuring message including a field indicating timing information based on the minimum time gap, wherein the configuring message further indicates a number of Physical Sidelink Control Channel (PSCCH)/Physical Sidelink Shared Channel (PSSCH) occasions after the reception of the configuring message for which resources configured by the configuring message are active; and
    schedule, at the computing apparatus, the SL transmission based on the timing information.

9. The computing apparatus of claim 8, the memory further storing instructions that, when executed by the processor, configure the computing apparatus to process a downlink control information (DCI) message that triggers the SL transmission, wherein the SL transmission is further scheduled in response to receiving the DCI message.

10. The computing apparatus of claim 9, wherein the DCI message is formatted for one or more of a Control Resource Set (CORESET), a search space, a periodicity of monitoring, and a number of candidates per aggregation level.

11. The computing apparatus of claim 8, wherein the configuring message is an RRC message.

12. The computing apparatus of claim 8, wherein the timing information is an offset relative to one of a Direct Frame Number (DFN) and a System Frame Number (SFN).

13. The computing apparatus of claim 8, wherein the minimum time gap for use by the UE is a cross-Radio Access Technology (RAT) scheduling delay at the UE.

14. The computing apparatus of claim 8, wherein the configuring message further indicates an absolute time of activity for the resources configured by the configuring message.

\* \* \* \* \*